(12) United States Patent
Shigezumi et al.

(10) Patent No.: US 8,426,074 B2
(45) Date of Patent: Apr. 23, 2013

(54) SOLID OXIDE FUEL CELL

(75) Inventors: Tsukasa Shigezumi, Kitakyushu (JP);
Toshiharu Ooe, Kitakyushu (JP);
Katsuhisa Tsuchiya, Kitakyushu (JP);
Kiyotaka Nakano, Kitakyushu (JP);
Yoshiyuki Kawamura, Kitakyushu (JP)

(73) Assignee: Toto Ltd., Fukuoka (JP)

(*) Notice: Subject to any disclaimer, the term of this patent is extended or adjusted under 35 U.S.C. 154(b) by 0 days.

(21) Appl. No.: 13/262,162

(22) PCT Filed: Mar. 31, 2010

(86) PCT No.: PCT/JP2010/055913
§ 371 (c)(1),
(2), (4) Date: Sep. 29, 2011

(87) PCT Pub. No.: WO2010/114046
PCT Pub. Date: Oct. 7, 2010

(65) Prior Publication Data
US 2012/0028153 A1    Feb. 2, 2012

(30) Foreign Application Priority Data
Mar. 31, 2009    (JP) .................................. 2009-087229

(51) Int. Cl.
*H01M 8/04*    (2006.01)
*H01M 8/12*    (2006.01)

(52) U.S. Cl.
USPC ............................ 429/432; 429/430; 429/495

(58) Field of Classification Search .................. None
See application file for complete search history.

(56) References Cited

U.S. PATENT DOCUMENTS

| 8,318,367 B2 * | 11/2012 | Makita et al. | 429/432 |
| 2004/0253495 A1 * | 12/2004 | LaVen | 429/23 |
| 2006/0014063 A1 * | 1/2006 | Kokubo | 429/23 |

FOREIGN PATENT DOCUMENTS

| JP | 05-003041 | * | 1/1993 |
| JP | 05-003041 A | | 1/1993 |
| JP | 2003-217627 A | | 7/2003 |
| JP | 2004-164909 A | | 6/2004 |
| JP | 2006-244821 A | | 9/2006 |
| JP | 2007-087756 A | | 4/2007 |
| JP | 2008-159362 A | | 7/2008 |

OTHER PUBLICATIONS

International Search Report for International Application No. PCT/JP2010/055913, dated Jul. 20, 2010, 2 pages.

(Continued)

*Primary Examiner* — John S Maples
(74) *Attorney, Agent, or Firm* — Brinks Hofer Gilson & Lione

(57) ABSTRACT

A solid oxide fuel cell capable of extending the time period over which initial rated output power is maintained, while restraining increases in running cost. The present invention is a solid oxide fuel cell (1), having a fuel cell module (2) furnished with multiple fuel cell units, a fuel supply device (38), an oxidant gas supply device (45), and a controller (110) for controlling the amount of fuel supplied; the controller is furnished with a degradation determining circuit (110*a*) for determining degradation, and a fuel correction circuit (110*b*) for correcting the fuel supply amount based on the degradation determination; when it is determined that the fuel cell module has degraded, the fuel correction circuit executes a correction so that rated output power is maintained, and when the predetermined correction switching condition is satisfied, the fuel correction circuit executes a correction to reduce the fuel cell module rated output power.

15 Claims, 14 Drawing Sheets

OTHER PUBLICATIONS

Written Opinion of the International Searching Authority for International Application No. PCT/JP2010/055913, dated Jul. 20, 2010, 4 pages.

International Preliminary Report on Patentability for International Application No. PCT/JP2010/055913, dated Nov. 15, 2011, 6 pages.

* cited by examiner

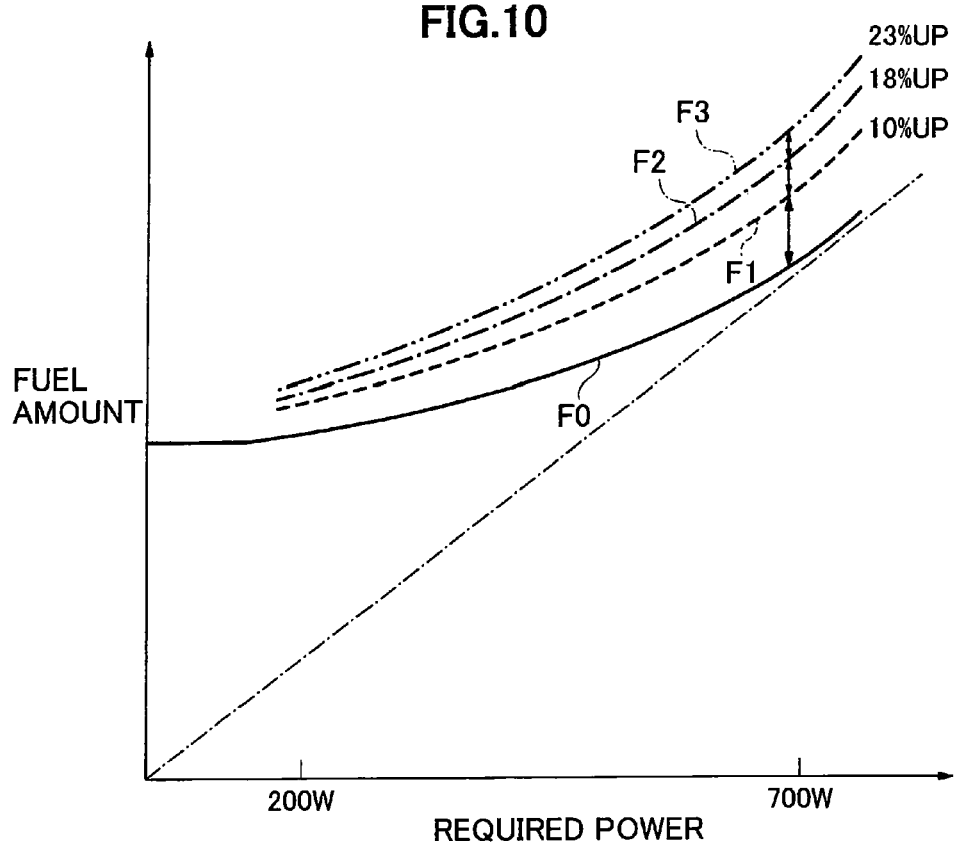
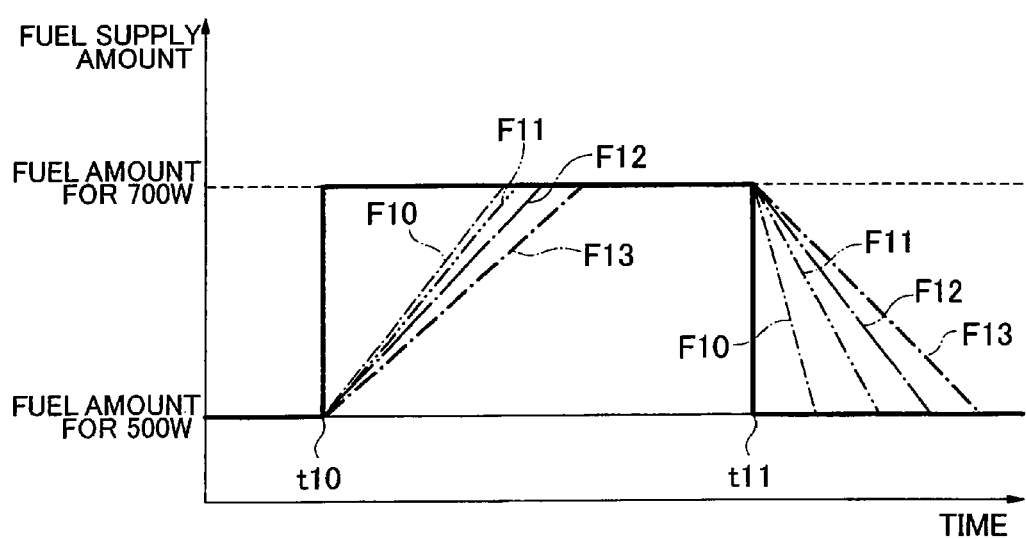

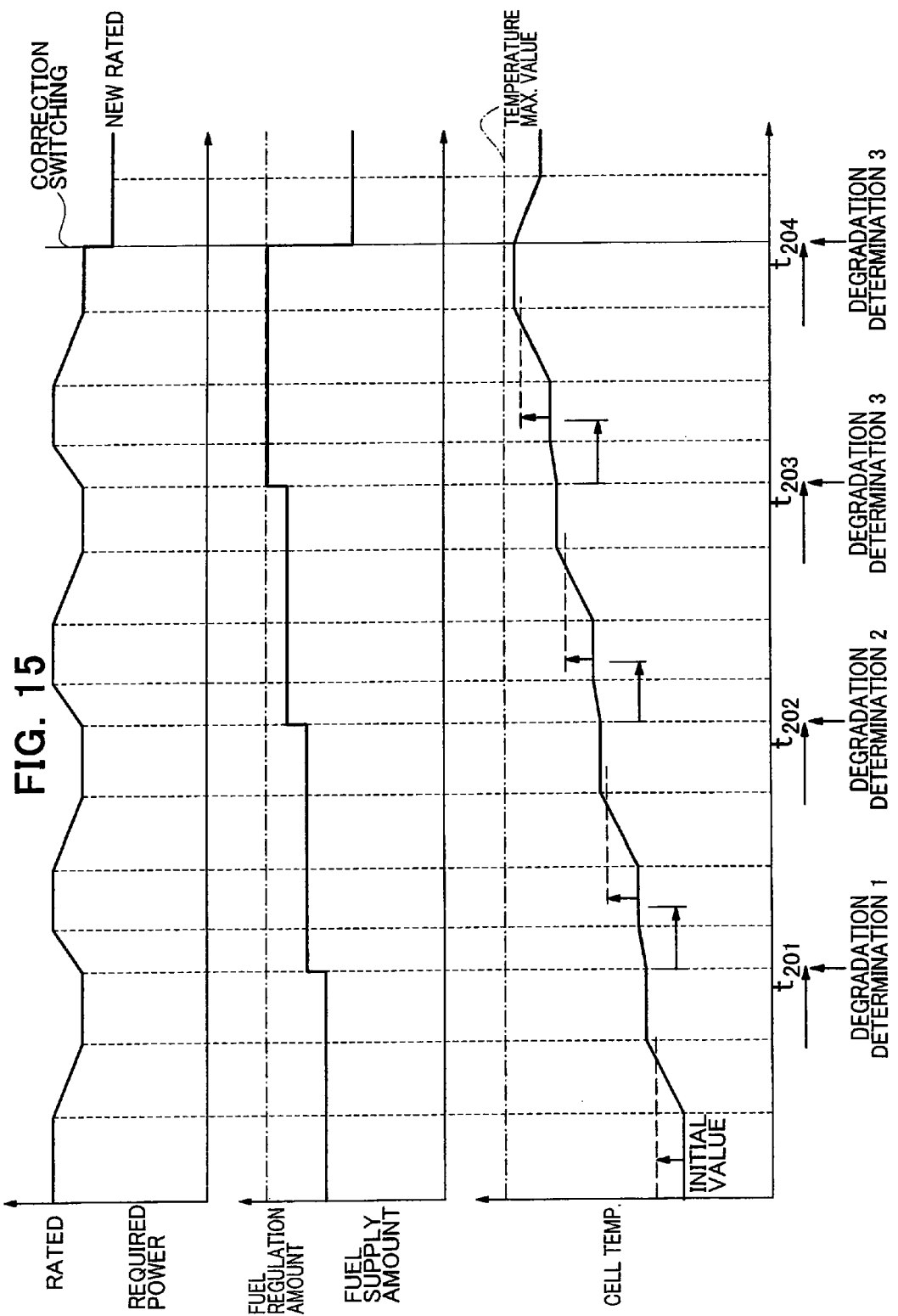

SOLID OXIDE FUEL CELL

This application is a 371 application of PCT/JP2010/055913 having an international filing date of Mar. 31, 2010, which claims priority to JP2009-087229 filed Mar. 31, 2009, the entire contents of which are incorporated herein by reference.

TECHNICAL FIELD

The present invention relates to a solid oxide fuel cell.

BACKGROUND ART

Solid oxide fuel cells ("SOFCs" below) operate at relatively high temperatures, using an oxide ion conducting solid electrolyte as an electrolyte, with electrodes placed on both sides thereof, and with fuel gas supplied to one side thereof and oxidizer (air, oxygen, or the like) supplied to the other side thereof.

In such SOFCs, steam or $CO_2$ is produced by the reaction between oxygen ions passed through the oxide ion conducting solid electrolyte and fuel, thereby generating electrical and thermal energy. The electrical energy is extracted from the SOFC, where it is used for various electrical purposes. On the other hand, thermal energy is used to raise the temperature of the fuel, the reformer, the water, the oxidant, and the like.

It is known that fuel cell units degrade with usage over long time periods. Unexamined Patent Application 2007-87756 (Patent Document 1) sets forth a solid oxide fuel cell. It is stated that in this fuel cell, degradation of the fuel cell units can be reduced by adjusting the flow rate of fuel.

A fuel supply amount control device, fuel supply amount control method, and electrical power supply system are also set forth in Unexamined Patent Application 2003-217627 (Patent Document 2). In this fuel supply amount control device, the amount of fuel supplied is compensated when the electrical power extractable from a predetermined amount of fuel supplied decreases due to degradation of fuel cell units.

In general, the electrical power extractable from degraded fuel cell units is reduced relative to the same fuel supply amount. Therefore when the electrical power which can be extracted has declined, the fuel supply amount is compensated to further raise the temperature of fuel cell units through increased fuel supply amounts, thereby lengthening the time period over which an initial rated output power can be extracted from the fuel cell.

PRIOR ART REFERENCES

Patent References

Patent Document 1: Unexamined Patent Application 2007-87756
Patent Document 2: Unexamined Patent Application 2003-217627

SUMMARY OF THE INVENTION

Problems the Invention Seeks to Resolve

However, a problem was posed in that not only were degraded fuel cells placed in a high temperature state, but because they were constituted so that their initial rated output power could be extracted by further upward compensation of the fuel supply amount, degradation was further promoted due to the much higher temperature state of the fuel cell units induced by the increased fuel, so while the period over which the rated output power could be extracted was lengthened, the period over which a fuel cell module containing the fuel cell units could be used was shortened as degradation progressed.

Also, because fuel cell units in which degradation has progressed have a reduced fuel-to-electrical power conversion efficiency, supplying a large amount of fuel to fuel cell units in which degradation has advanced in order to maintain rated output power leads to the problem of high fuel cell running cost.

Therefore the present invention has the object of providing a solid oxide fuel cell capable of extending the time period over which the initial rated output power can be maintained, while inhibiting curtailment of the period over which the fuel cell module can be used.

The present invention also has the object of providing a solid oxide fuel cell capable of extending the time period over which the initial rated output power can be maintained, while restraining increases in running cost.

Means for Resolving the Problems

To resolve the above-described problems, the present invention is a solid oxide fuel cell having: fuel cell module furnished with multiple fuel cell units; a fuel supply device for supplying fuel to these fuel cell module; an oxidant gas supply device for supplying oxidant gas to the fuel cell module; and a controller for controlling the amount of fuel supplied from the fuel supply device; wherein the controller is furnished with a degradation determining circuit for determining degradation of a fuel cell module, and with a fuel correction circuit for correcting the fuel supply amount based on the degradation determination performed by this degradation determining circuit; whereby if it is determined by the degradation determining circuit that the fuel cell module degraded prior to the satisfaction of a predetermined correction switching condition after the start of initial operation of the fuel cell module, the fuel correction circuit executes a correction to increase the fuel supply amount supplied to the fuel cell module so that rated output power, which is the maximum power output from the fuel cell module, is maintained, while on the other hand, after degradation of the fuel cell module advances and the predetermined correction switching condition is satisfied, the fuel correction circuit corrects the fuel supply amount supplied to the fuel cell module so that the fuel cell module rated output power is reduced.

In the present invention thus constituted, the controller controls the fuel supply device and the oxidant gas supply device to supply fuel and oxidant gas to the fuel cell module. Also, the degradation determining circuit provided with the controller determines degradation in the fuel cell module, and the fuel correction circuit executes a correction to increase the amount of fuel supplied to the fuel cell module so that rated output power is maintained when a determination is made that the fuel cell module has degraded prior to the fulfillment of predetermined correction switching condition. After degradation of the fuel cell module progresses and the predetermined correction switching condition is satisfied, the fuel correction circuit executes a correction to reduce the rated output power of the fuel cell module.

In the present invention thus constituted, the fuel supply amount is corrected so that the rated output power is maintained when a degradation determination is made prior to the fulfillment of predetermined correction switching condition. When degradation further progresses to the degree that the predetermined correction switching condition is satisfied, maintaining of the fuel cell module rated output power is interrupted, rated output power is reduced, and the fuel cell is operated in a manner that places weight on extending fuel cell module life. Excessively high temperature states in the fuel cell units can thus be restrained, and the time period over which initial rated output power is maintained can be extended while inhibiting curtailment of the period over which the fuel cell module can be used. Also, because rated output power is reduced after degradation progresses and generating efficiency drops, it becomes possible to maintain the supply of electrical power in a range capable of withstanding practical use while restraining increases in running costs, and the fuel cell module can continue to be used over long time periods.

In the present invention, after the predetermined correction switching condition is satisfied, the fuel correction circuit preferably executes a correction to reduce the amount of fuel supplied to the fuel cell module, and the range of fuel supply amount reduction is smaller in the corrections executed later than in the corrections executed earlier.

In the present invention thus constituted, the fuel cell module is subjected to a burden in order to maintain rated output power until correction switching condition is satisfied in the fuel cell module, but after the correction switching condition is satisfied, the fuel supply amount is greatly reduced, and the burden on the fuel cell module is reduced. On the other hand, there is no major reduction in the fuel supply amount after the burden on the fuel cell module is reduced, and major declines in output power are prevented. This makes it possible both to extend the number of years of usable fuel cell module life, and to maintain output power.

In the present invention, the fuel correction circuit preferably corrects the fuel supply amount supplied to the fuel cell module so that fuel cell unit temperatures do not rise after the predetermined correction switching condition is satisfied.

In the present invention thus constituted, operations are carried out so that the fuel cell unit temperature does not rise after the predetermined correction switching condition is satisfied. There is a tendency for solid oxide fuel cell temperatures to rise with the advance of degradation, and breakage of the solid oxide fuel cells may be induced by excessive temperature rises. In the present invention excessive temperature rises are prevented, and increased burden on solid oxide fuel cells in which degradation has advanced can be avoided. This makes it possible to extend the number of years of usable fuel cell module life.

In the present invention, the fuel correction circuit preferably corrects the fuel supply amount supplied to the fuel cell module so as to decrease the temperature of the solid oxide fuel cells after the predetermined correction switching condition is satisfied.

In the present invention thus constituted, the fuel cell is operated so that the temperature of the solid oxide fuel cells declines after the predetermined correction switching condition is satisfied, therefore the burden on the solid oxide fuel cells is actively reduced, and the usable life of the fuel cell module can be greatly extended.

In the present invention the predetermined correction switching condition is preferably a rise in the solid oxide fuel cell temperature to a predetermined correction switching temperature or above, an increase in fuel supply amount to a predetermined correction switching fuel supply amount, a decrease in fuel cell module output power to a predetermined correction switching power or below, or a decrease in fuel cell module output voltage to a predetermined correction switching voltage or below.

In the present invention thus constituted, a determination of degradation of the fuel cell module can be made based on the temperature of the fuel cell units, which directly reflect fuel cell module degradation, and on the easily-detected fuel supply amount and output power or output voltage, which directly reflect a decline in fuel cell performance.

In the present invention, after the predetermined correction switching condition is satisfied the fuel correction circuit preferably executes a correction to reduce fuel cell module rated output power and, on the other hand once rated output power drops below a predetermined minimum power, the fuel correction circuit executes a correction to maintain rated output power.

In the present invention thus constituted, rated output power is reduced as degradation advances so as to reduce the burden on and extend the useful life of fuel cell module, while at the same time loss of utility of the fuel cells is prevented by maintaining rated output power at a minimum power or above.

The present invention is further preferably furnished with a notification device; this notification device gives notice that the fuel cell module can no longer produce a minimum electrical power when the predetermined minimum power can no longer be maintained, notwithstanding the execution of corrections by the fuel correction circuit.

In the present invention thus constituted, the fact that the fuel cell module can no longer produce minimum power is notified, thereby prompting maintenance and parts changes in the fuel cell module.

To resolve the above-described problems, the present invention is a solid oxide fuel cell having: fuel cell module furnished with multiple fuel cell units; a fuel supply means for supplying fuel to these fuel cell module; an oxidant gas supply means for supplying oxidant gas to the fuel cell module; and a control means for controlling the amount of fuel supplied from the fuel supply means; wherein the control means is furnished with a degradation determining means for determining degradation of a fuel cell module, and a fuel correction means for correcting the fuel supply amount based on the degradation determination performed by this degradation determining means; and if it is determined by the degradation determining means that the fuel cell module degraded prior the satisfaction of predetermined correction switching condition after the start of initial operation of the fuel cell module, the fuel correction means executes a correction to increase the fuel supply amount supplied to the fuel cell module so that rated output power, which is the maximum power output from the fuel cell module, is maintained, while on the other hand, after degradation of the fuel cell module advances and the predetermined correction switching condition is satisfied, the fuel correction means corrects the fuel supply amount supplied to the fuel cell module so that the fuel cell module rated output power is reduced.

Effect of the Invention

Using the solid oxide fuel cell of the present invention, the time period over which the initial rated output power is maintained can be extended while inhibiting the curtailment of fuel cell module usable life.

Using the solid oxide fuel cell of the present invention, the time period over which the initial rated output power is maintained can be extended while restraining increases in running cost.

BRIEF DESCRIPTION OF FIGURES

FIG. 10: A graph showing an example of the relationship between the required generation amount input to the control section and the fuel supply amount required to produce the required generation amount.

FIG. 11: A graph showing an example of the change over time in fuel supply amount relative to the change in required generation amount.

FIG. 15: A timing chart showing an example of the operation of a fuel cell unit according to a variation of an embodiment of the present invention.

EMBODIMENTS OF THE INVENTION

Next, referring to the attached drawings, we discuss a solid oxide fuel cell (SOFC) according to an embodiment of the present invention.

Figure 1:
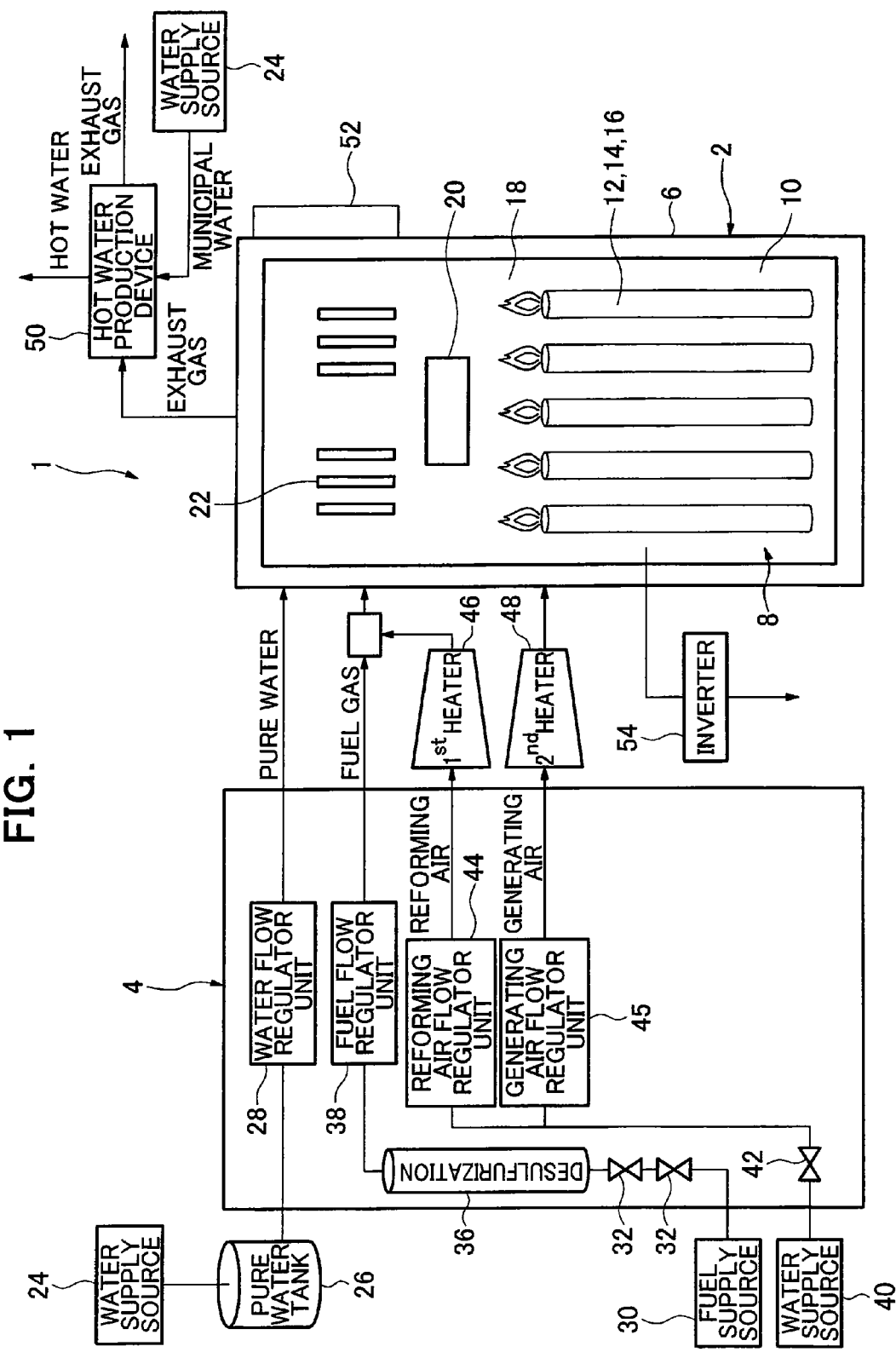
FIG. 1: An overall schematic showing a solid oxide fuel cell (SOFC) according to an embodiment of the present invention.

FIG. 1 is an overview diagram showing a solid oxide fuel cell (SOFC) according to an embodiment of the present invention.

As shown in FIG. 1, the solid oxide fuel cell (SOFC) of this embodiment of the present invention is furnished with a fuel cell module 2 and an auxiliary unit 4.

The fuel cell module 2 is furnished with a housing 6; a sealed space 8 is formed within the housing 6, mediated by insulating material (not shown; the insulating material is not an indispensable structure and may be omitted). Note that it is acceptable not to provide insulating material. A fuel cell assembly 12 for carrying out the electrical generating reaction between fuel gas and oxidant (air) is disposed in the generating chamber 10 at the lower portion of this sealed space 8. This fuel cell assembly 12 is furnished with ten fuel cell stacks 14 (see FIG. 5), and a fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned generating chamber 10 in the fuel cell module 2 sealed space 8; residual fuel gas and residual oxidizer (air) not used in the electrical generation reaction are burned in this combustion chamber 18 and produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving combustion heat and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate of water supplied from the reservoir tank. The auxiliary tank 4 is further furnished with a gas shutoff valve 32 for shutting off the fuel gas supply from a fuel supply source 30 such as municipal gas or the like, and a fuel flow rate regulator unit 38 (a "fuel pump" or the like driven by a motor) for regulating the flow rate of fuel gas. Furthermore, an auxiliary unit 4 is furnished with an electromagnetic valve 42 for shutting off air serving as an oxidizer supplied from an air supply source 40, a reforming air flow rate regulator unit 44 and generating air flow rate regulator unit 45 ("air blower" or the like driven by a motor) for regulating air flow rate, a first heater 46 for heating reforming air supplied to the reformer 20, and a second heater 48 for heating generating air supplied to the generating chamber. This first heater 46 and second heater 48 are provided in order to efficiently raise the temperature at startup, and may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater, not shown.

A control box 52 for controlling the amount of fuel gas supplied, etc. is connected to the fuel cell module 2.

Furthermore, an inverter 54 serving as an electrical power extraction unit (electrical power conversion unit) for supplying electrical power generated by the fuel cell module to the outside is connected to the fuel cell module 2.

Figure 2:
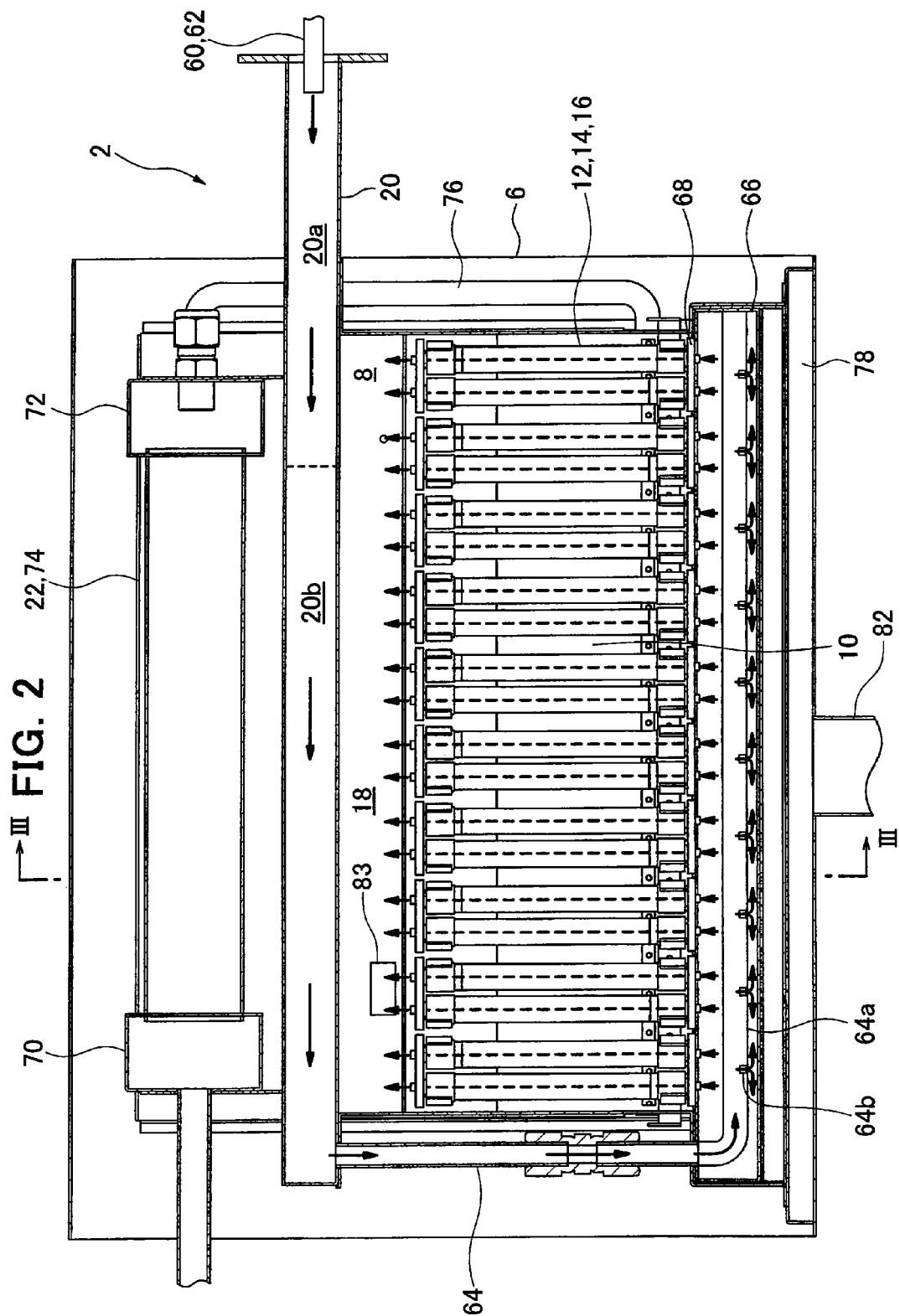
FIG. 2: A front elevation sectional diagram showing a solid oxide fuel cell (SOFC) fuel cell module according to an embodiment of the present invention.
Figure 3:
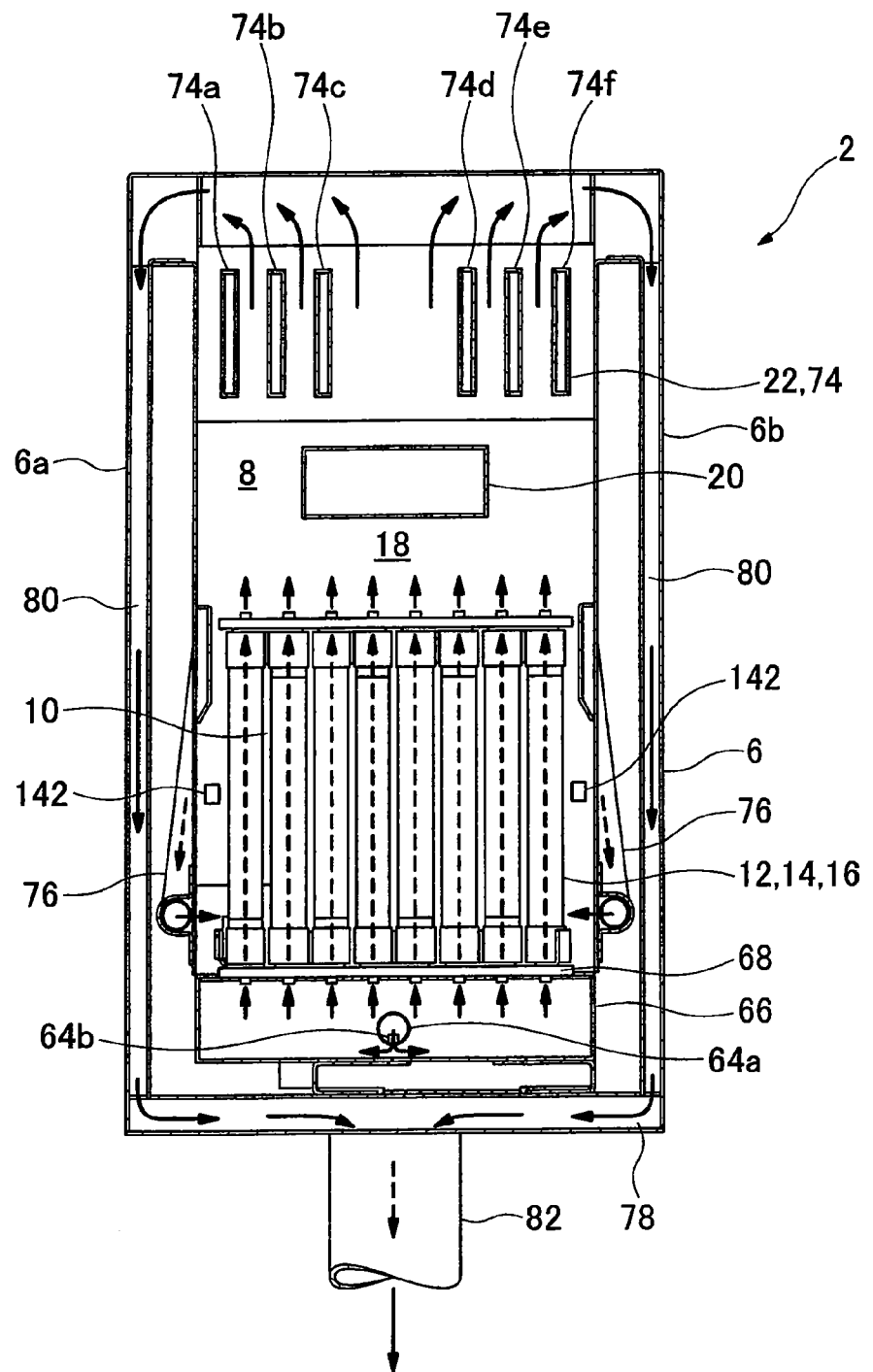
FIG. 3: A sectional diagram along line III-III in FIG. 2.

The internal structure of the solid oxide fuel cell (SOFC) fuel cell module of this embodiment of the present invention is explained using FIGS. 2 and 3. FIG. 2 is a side elevation sectional diagram showing a fuel cell module in a solid oxide fuel cell (SOFC) according to an embodiment of the present invention; FIG. 3 is a sectional diagram along line III-III of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of aluminum spheres, or ruthenium is imparted to aluminum spheres.

A fuel gas supply line 64 is connected to the downstream end of the reformer 20; this fuel gas supply line 64 extends downward, then further extends horizontally within a manifold 66 formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

Next, an air heat exchanger 22 is provided over the reformer 20. This air heat exchanger 22 is furnished with an air concentration chamber 70 on the upstream side and two air distribution chambers 72 on the downstream side; these air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top end side of the exhaust gas conduit 80 communicates with the space in which the air heat exchanger 22 is disposed, and the bottom end side communicates with the exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18.

Figure 4:
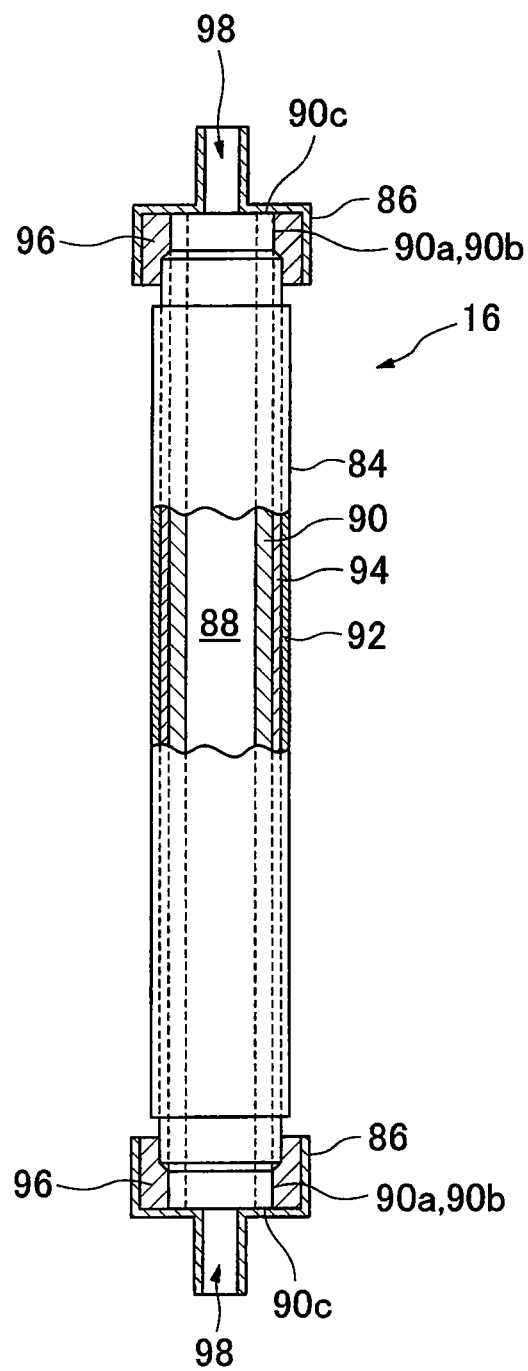
FIG. 4: A partial section showing a solid oxide fuel cell (SOFC) fuel cell unit according to an embodiment of the present invention.

Next we discuss the fuel cell unit 16, referring to FIG. 4. FIG. 4 is a partial section showing a solid oxide fuel cell (SOFC) fuel cell unit according to an embodiment of the present invention.

As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom ends of the fuel cell device 16 have the same structure, therefore we will here discuss specifically the internal electrode terminal 86 attached at the top end side. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with the inside electrode layer 90 fuel gas flow path 88 is formed at the center portion of the inside electrode terminal 86.

The inside electrode layer 90 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
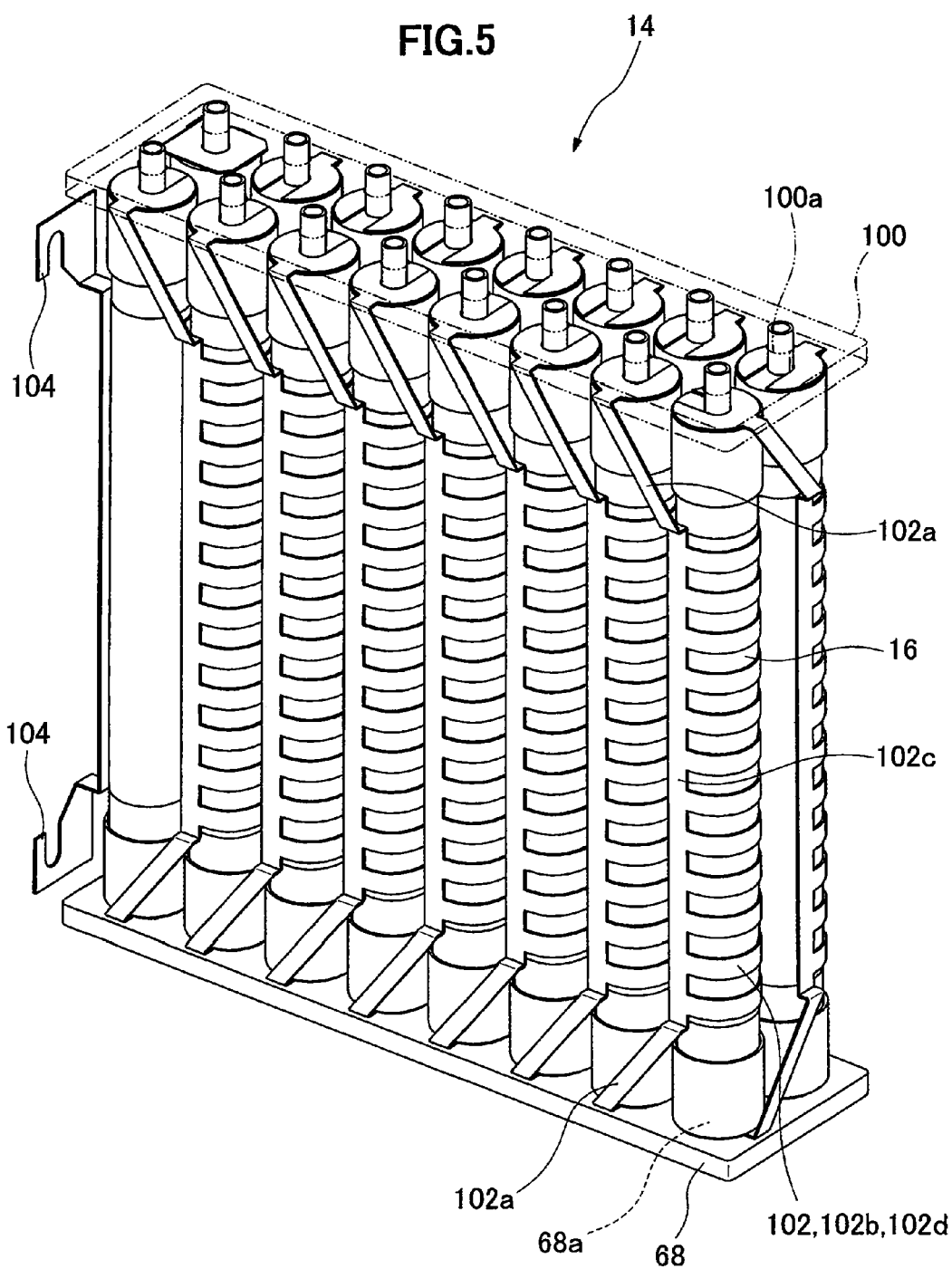
FIG. 5: A perspective diagram showing a solid oxide fuel cell (SOFC) fuel cell stack according to an embodiment of the present invention.

Next we discuss the fuel cell stack 14, referring to FIG. 5. FIG. 5 is a perspective view showing the fuel cell stack in a solid oxide fuel cell (SOFC) according to an embodiment of the present invention.

As shown in FIG. 5, the fuel cell stack 14 is furnished with sixteen fuel cell units 16; the top end side and bottom end side of these fuel cell units 16 are respectively supported by a lower support plate 68 and upper support plate 100. Through holes 68a and 100a, through which the inside electrode terminal 86 can penetrate, are provided on this lower support plate 68 and outer support plate 100.

In addition, a current collector 102 and an external terminal 104 are attached to the fuel cell unit 16. This current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter surface of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from this vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, electrode terminals 86 at the top and bottom ends of the two fuel cell units 16 positioned at the end of the fuel cell stack 14 (at the front and back sides on the left edge in FIG. 5) are respectively connected to the outside terminals 104. These external terminals 104 are connected to the external terminals 104 (not shown) at the ends of the adjacent fuel cell stack 14, and as described above, all of the 160 fuel cell units 16 are connected in series.

Figure 6:
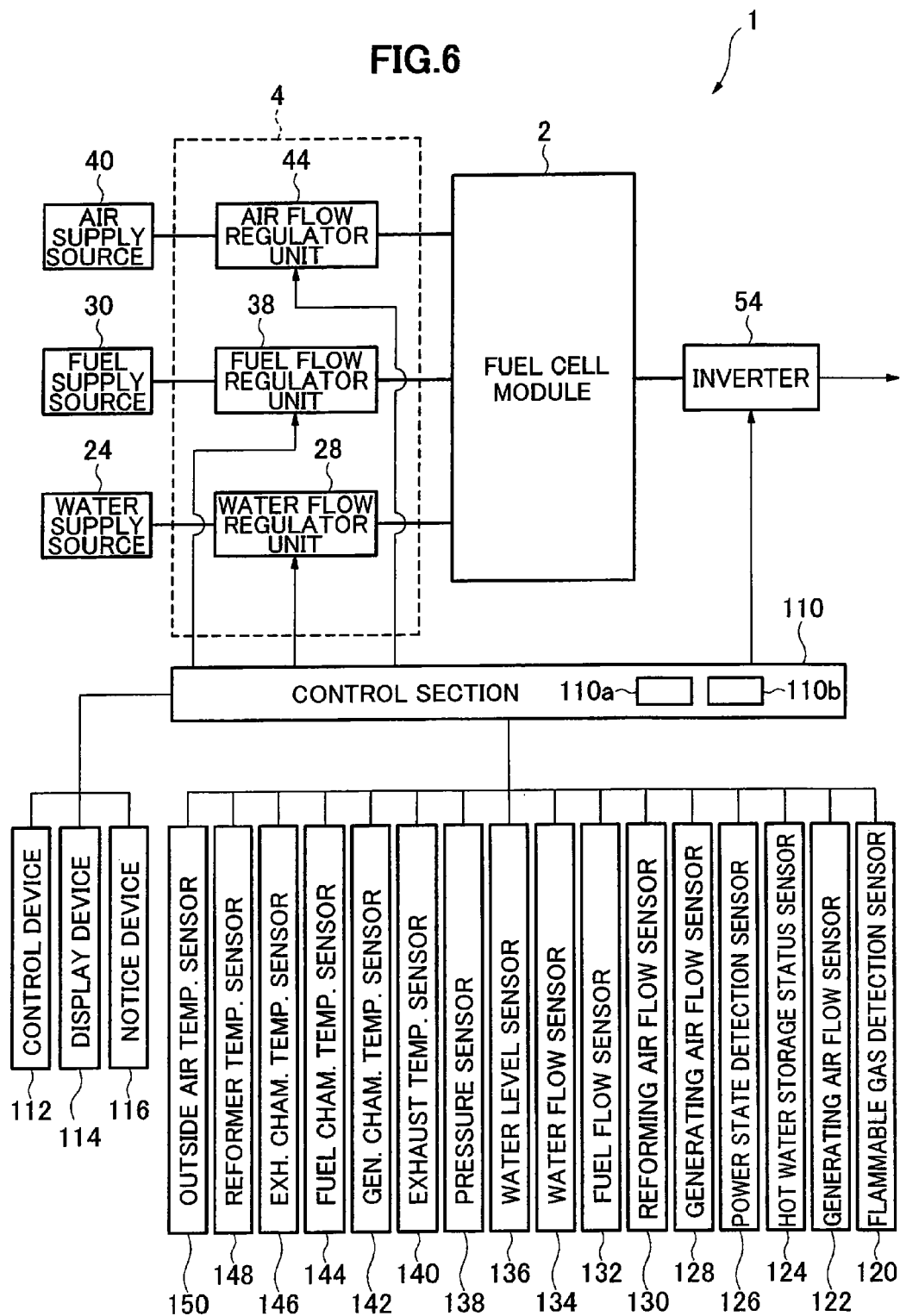
FIG. 6: A block diagram showing a solid oxide fuel cell (SOFC) according to an embodiment of the present invention.

Next, referring to FIG. 6, we discuss the sensors attached to the solid oxide fuel cell (SOFC) according to the present embodiment. FIG. 6 is a block diagram showing a solid oxide fuel cell (SOFC) according to an embodiment of the present invention.

As shown in FIG. 6, a solid oxide fuel cell device 1 is furnished with a control unit 110; an operating device 112 provided with operating buttons such as "ON" or "OFF" for user operation, a display device 114 for displaying various data such as a generator output value (Watts), and a notification device 116 for issuing warnings during abnormal states and the like are connected to this control unit 110. This notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the CO gas detection sensor 120 is to detect leakage of CO in the exhaust gas, which is meant to be exhausted to the outside via the exhaust gas conduit 80, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A generator air flow rate detection sensor 128 detects the flow rate of generator air supplied to the generating chamber 10.

A reforming air flow rate sensor 130 detects the rate of reforming air flow supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) is placed outdoors, the outside temperature sensor 150 detects the temperature of the outside atmosphere. Sensors to detect outside atmospheric humidity and the like may also be provided.

Signals from these various sensor types are sent to the control unit 110; the control unit 110 sends control signals to the water flow rate regulator unit 28, the fuel flow rate regulator unit 38, the reforming air flow rate regulator unit 44, and the generating air flow rate regulator unit 45 based on data from the sensors, and controls the flow rates in each of these units.

The control unit 110 sends control signals to the inverter 54 to control the amount of electrical power supply.

Figure 7:
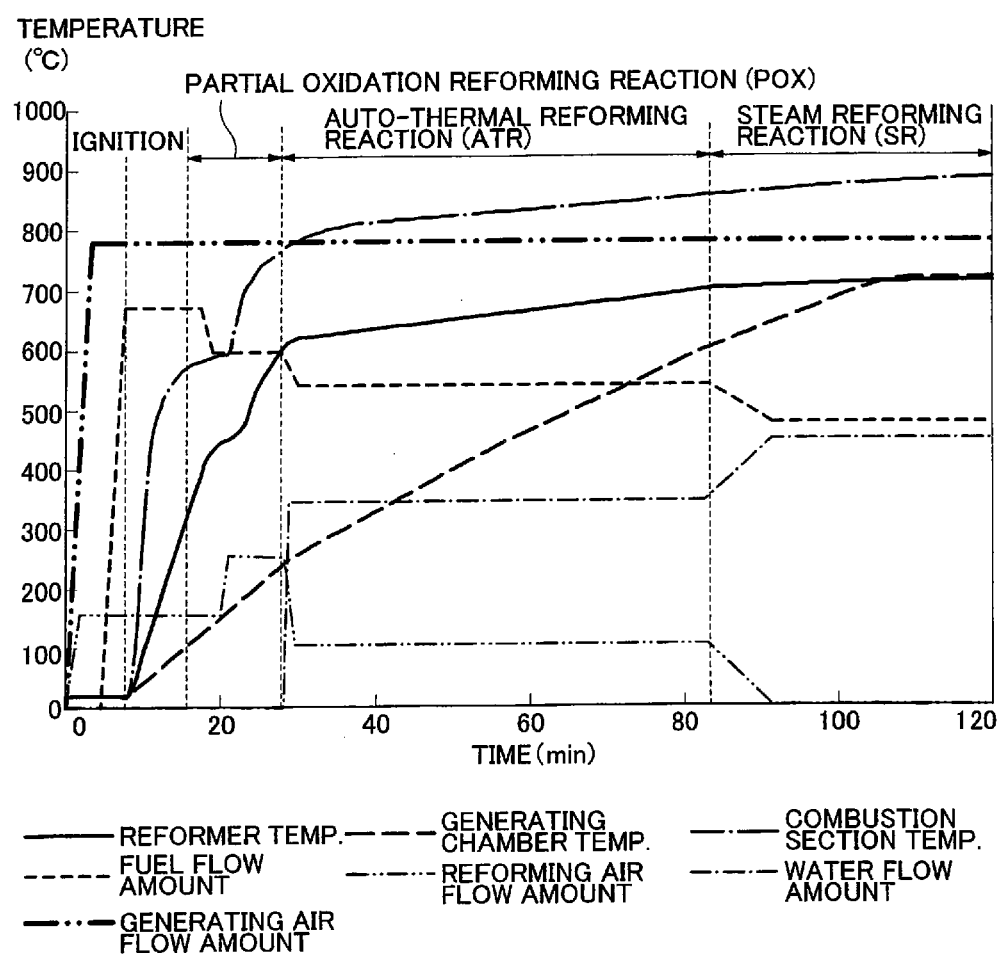
FIG. 7: A timing chart showing the operation at the time of startup of a solid oxide fuel cell (SOFC) according to an embodiment of the present invention.

Next, referring to FIG. 7, we discuss the operation of a solid oxide fuel cell (SOFC) according to the present embodiment at the time of start up.

FIG. 7 is a timing chart showing the operations of a solid oxide fuel cell (SOFC) according to an embodiment of the present invention at the time of start up.

At the beginning, in order to warm up the fuel cell module 2, operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 through a first heater 46 to the reformer 20 on the fuel cell module 2. At the same time, generating air is supplied from the generating air flow rate regulator unit 45 through a second heater 48 to the air heat exchanger 22 of the fuel cell module 2, and this generating air reaches the generating chamber 10 and the combustion chamber 18.

Immediately thereafter, fuel gas is also supplied from the fuel flow rate regulator unit 38, and fuel gas into which reform air is blended passes through the reformer 20, the fuel cell stack 14, and the fuel cell unit 16 to reach the combustion chamber 18.

Next, ignition is brought about by the ignition device 83, and fuel gas and air (reforming air and generating air) supplied to the combustion chamber 18 is combusted. This combustion of fuel gas and air produces exhaust gas; the generating chamber 10 is warmed by this exhaust gas, and when the exhaust gas rises in the fuel cell module 2 sealed space 8, the fuel gas, which includes reforming air in the reformer 20 is warmed, as is the generating air inside the air heat exchanger 22.

At this point, fuel gas into which reform air is blended is supplied to the reformer 20 by the fuel flow rate regulator unit 38 and the reforming air flow rate regulator unit 44, therefore the partial oxidation reforming reaction POX given by Expression (1) proceeds. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the combustion chamber 18 is also heated by the combustion of the fuel gas and air, so that the fuel cell stack 14 is also heated from above, enabling as a result an essentially uniform rise in temperature in the vertical direction of the fuel cell stack 14. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, no major drop in temperature will be caused. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

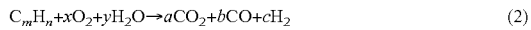
$$C_mH_n + xO_2 + yH_2O \rightarrow aCO_2 + bCO + cH_2 \quad (2)$$

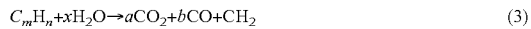
$$C_mH_n + xH_2O \rightarrow aCO_2 + bCO + cH_2 \quad (3)$$

This steam reforming reaction SR is an endothermic reaction, therefore the reaction proceeds as a thermal balance is maintained with the combustion heat from the combustion chamber 18. At this stage, the fuel cell module is in the final stages of startup, therefore the temperature has risen to a sufficiently high level within the generating chamber 10 so that no major temperature dropped is induced in the generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reaches a predetermined generating temperature which is lower than the rated temperature at which the cell module 2 can be stably operated, the circuit which includes the fuel cell module 2 is closed, electrical generation by the fuel cell module 2 begins, and current then flows to the circuit. Generation of electricity by the fuel cell module 2 causes the fuel cell 84 itself to emit heat, such that the temperature of the fuel cell 84 rises. As a result, the rated temperature at which the fuel cell module 2 is operated becomes, for example, 600° C.-800° C.

Following this, an amount of fuel gas and air greater than that consumed by the fuel cell 84 is applied in order to maintain the rated temperature and continue combustion inside the combustion chamber 18. Generation of electricity by the high reform-efficiency steam reforming reaction SR proceeds while electricity is being generated.

Figure 8:
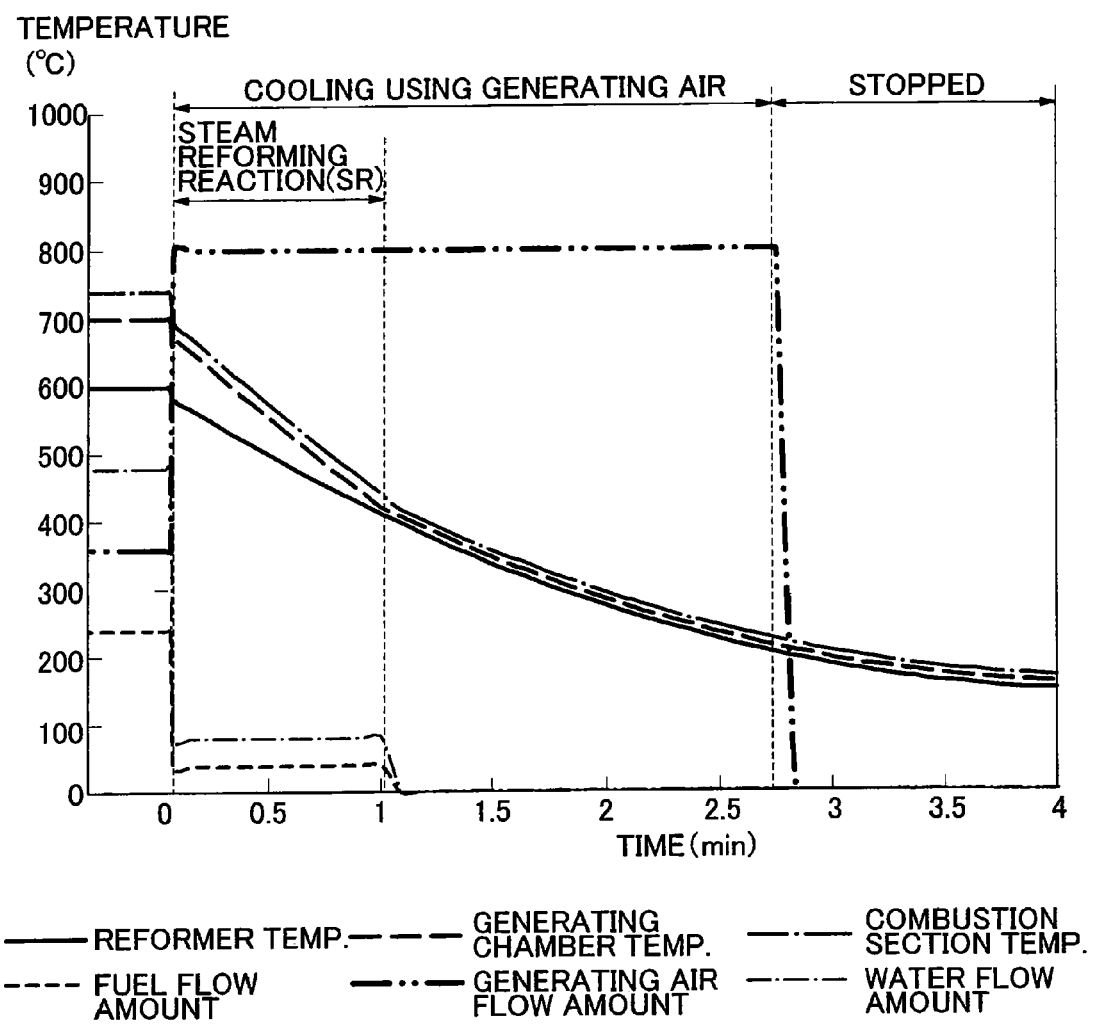
FIG. 8: A timing chart showing the operation at the time of shutdown of a solid oxide fuel cell (SOFC) according to an embodiment of the present invention.

Next, referring to FIG. 8, we discuss the operation upon stopping the solid oxide fuel cell (SOFC) of the present embodiment. FIG. 8 is a timing chart showing the operations which occur upon stopping the solid oxide fuel cell (SOFC) of the present embodiment.

As shown in FIG. 8, when stopping the operation of the fuel cell module 2, the fuel flow rate regulator unit 38 and the water flow rate regulator unit 28 are first operated to reduce the amount of fuel gas and steam being supplied to the reformer 20.

When stopping the operation of the fuel cell module 2, the amount of generating air supplied by the reforming air flow rate regulator unit 44 into the fuel cell module 2 is being increased at the same time that the amount of fuel gas and steam being supplied to the reformer 20 is being reduced; the fuel cell assembly 12 and the reformer 20 are air cooled to reduce their temperature. Thereafter, when the temperature of the generating chamber drops to, for example, 400° C., supply of the fuel gas and steam to the reformer 20 is stopped, and the steam reforming reaction SR in the reformer 20 ends. Supply of the generating air continues until the temperature in the reformer 20 reaches a predetermined temperature, e.g. 200° C.; when the predetermined temperature is reached, the supply of generating air from the generating air flow rate regulator unit 45 is stopped.

Thus in the present embodiment the steam reforming reaction SR by the reformer 20 and cooling by generating air are used in combination, therefore when the operation of the fuel cell module 2 is stopped, that operation can be stopped relatively quickly.

Next, referring to FIGS. 9 through 14, we discuss the operation of the solid oxide fuel cell 1 according to an embodiment of the present invention.

First, referring to FIGS. 9 through 12, we discuss the load following operation of the solid oxide fuel cell 1 and the fuel cell module 2 degradation determination.

Figure 9:
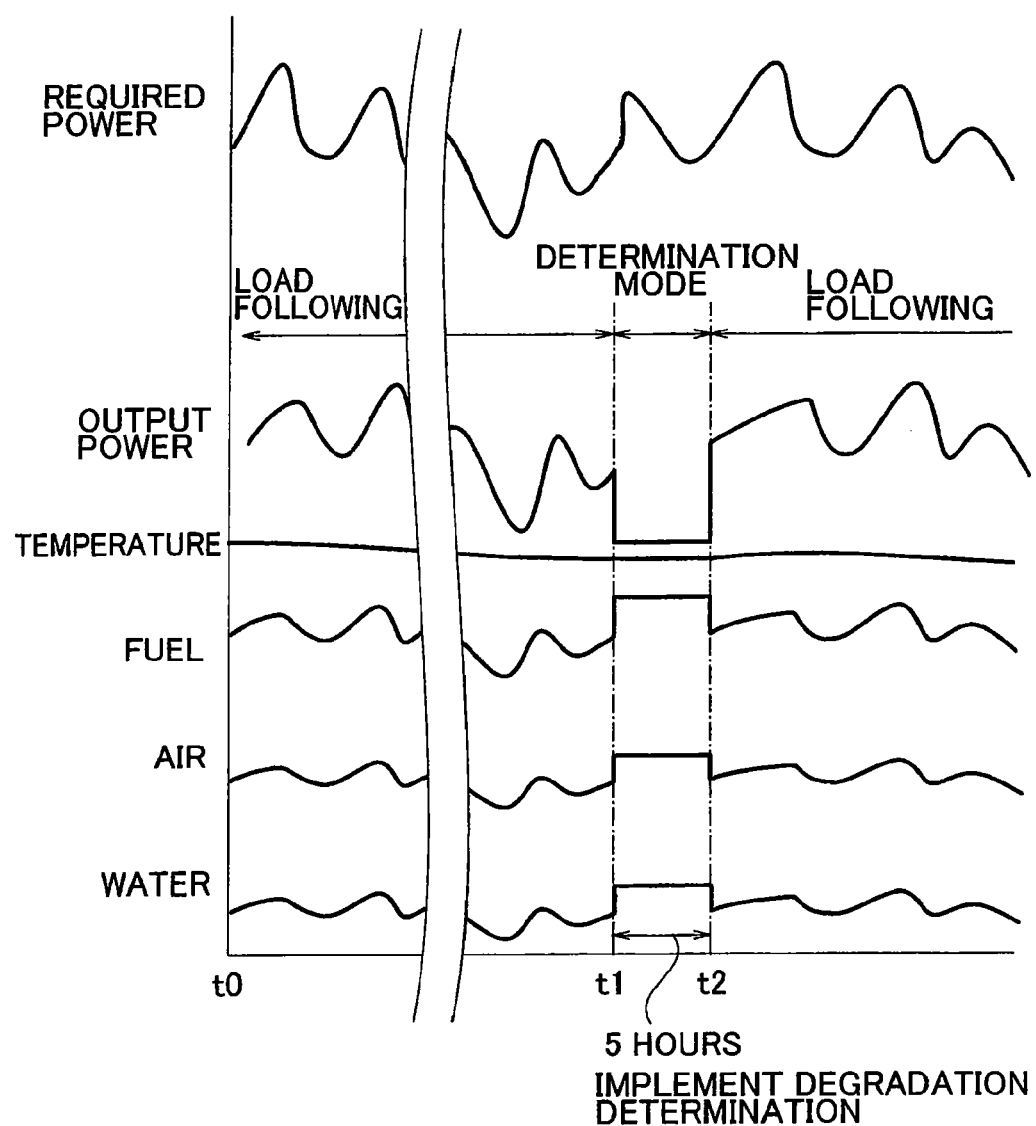
FIG. 9: A timing chart explaining the determination of degradation in a solid oxide fuel cell (SOFC) according to an embodiment of the present invention.
Figure 12:
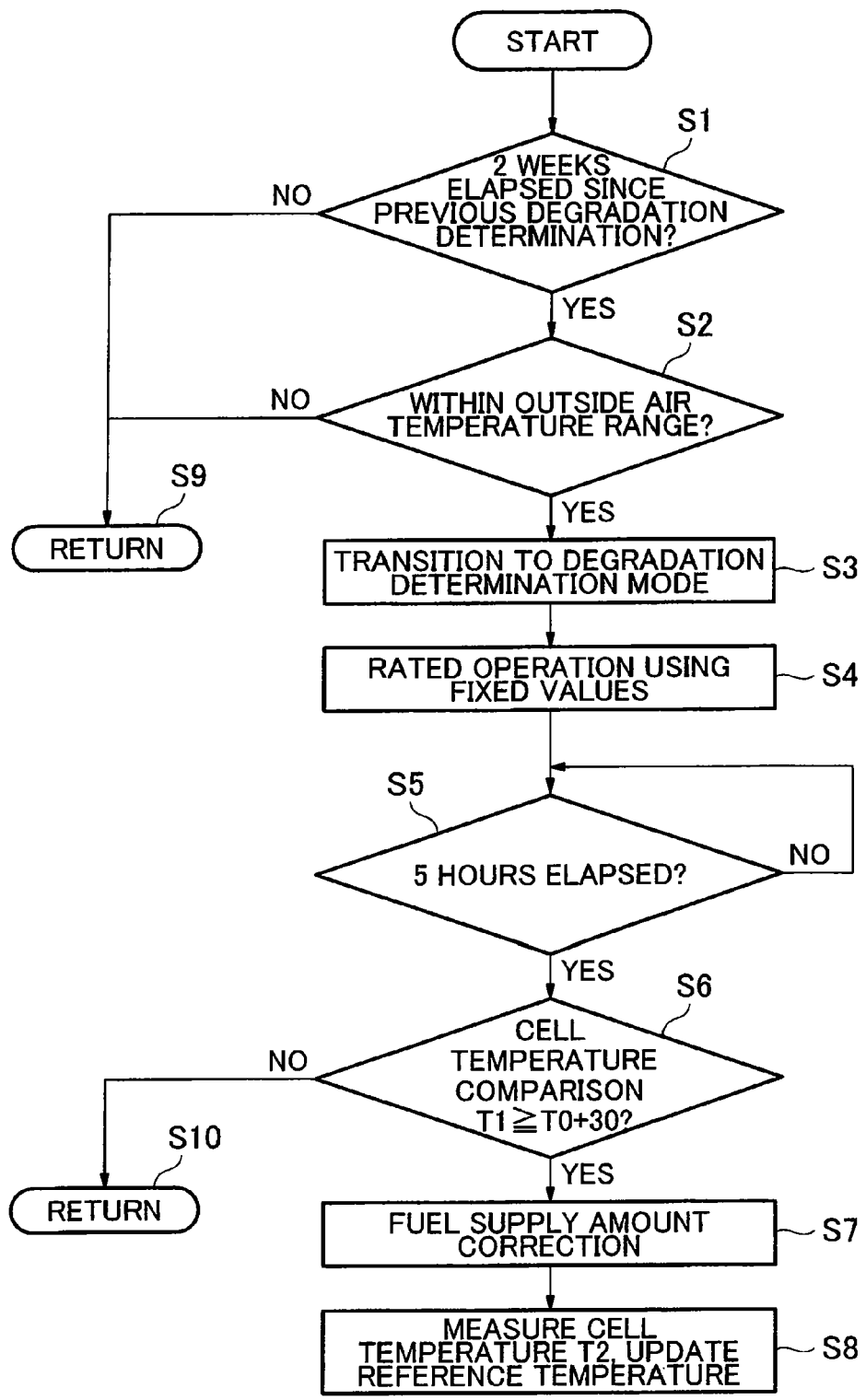
FIG. 12: A flow chart showing the degradation determination procedure.

FIG. 9 is a timing chart explaining the determination of degradation in a solid oxide fuel cell (SOFC) according to an embodiment of the present invention. FIG. 10 is graph showing an example of the relationship between the required generation amount input to the control section 110 and the fuel supply amount required to produce the required generation amount. FIG. 11 is graph showing an example of the change over time in fuel supply amount relative to the change in required generation amount. FIG. 12 is a flow chart showing the degradation determination procedure.

At times t0-t1 in FIG. 9, the solid oxide fuel cell 1 is performing a load following operation so that an output power can be obtained in accordance with the amount of generation required by the inverter 54 (FIG. 6). As shown in FIG. 6, that is, the control section 110 serving as controller sends signals to the fuel flow rate regulator unit 38 serving as fuel supply device, the generating air flow regulator unit 45 serving as oxidant gas supply device, and the water flow rate regulator unit 28 serving as water supply device in accordance with the amount of generation required from the inverter 54, and supplies the required flow rates of fuel, air, and water to the fuel cell module 2. The output power of the solid oxide fuel cell 1 thus varies, as shown in FIG. 9, so as to follow the amount of generation required from the inverter 54. There is a delay in the output power response to the required generation amount, and this is because changes in fuel supply amount and the like is smoothened that changes in output power are delayed; also, because there is a major restraint of change in fuel supply amount relative to sudden changes in required generation amount as well, output power following is delayed. Note that the control section 110, the fuel flow rate regulator unit 38, the generating air flow rate regulator unit 45, and the water flow rate regulator unit 28 respectively function as a control means, a fuel supply means, an oxidant gas supply means, and a water supply means.

The control section 110 determines the fuel supply amount using a graph, one example of which is shown in FIG. 10, in response to the amount of generation required from the inverter 54 and controls the fuel flow rate regulator unit 38 such that the determined amount (flow rate) of fuel is supplied to the fuel cell module 2. After the initial start of use of the solid oxide fuel cell 1 up until a determination is made that the fuel cell module 2 has degraded, the control section 110 determines a fuel supply amount relative to the required generation amount in accordance with curve F0 in FIG. 10. As shown in FIG. 10, the fuel supply amount is determined in such a way that it grows monotonically with the increase in required generation amount, but under a required generation amount of approximately 200 W, the fuel supply amount is approximately a fixed value.

In cases where the required generation amount is changed, suddenly changing the fuel supply amount will result in suddenly changes to the fuel cell unit temperature, which can speed up the degradation of the fuel cell module 2, therefore gradual increases or gradual decreases are adopted, as shown in FIG. 11, to smoothen changes in fuel supply amount. However, as shown in the diagram, when the increase in fuel is large there is smoothing, but when reducing the fuel there is unnecessary fuel consumption if the delay is large, therefore the degree of smoothing is reduced. FIG. 11 is a graph showing an example of the change in fuel supply amount versus time when the required generation amount is changed in a stepped manner from 500 W to 700 W. As shown in FIG. 11, if the required generation amount were suddenly changed from 500 W to 700 W at time t10, there would ideally be a sudden change from a fuel supply amount corresponding to a 500 W power output to a fuel supply amount corresponding to a 700 W power output. However, the control section 110 controls the fuel supply unit 38 so that the fuel supply amount is increased slowly as shown by imaginary line in FIG. 11, thereby avoiding a sudden increase in the fuel supply amount. Note that after initial use of the solid oxide fuel cell 1 up until a determination is made that the fuel cell module 2 has degraded, the control section 110 is controlled using load following with relatively high sensitivity characteristics to enable quick following of changes in required generation amount, and the fuel supply amount is increased according to line F10 in FIG. 11.

Similarly at time t11, even if the required generation amount changes from 700 W to 500 W, the control section 110 gradually decreases the fuel supply amount as shown by line F10 in FIG. 11 so that there is not a sudden decrease in the fuel supply amount. Note that the rate of change in fuel supply amount is set to be more gradual when increasing the fuel supply amount than when decreasing it.

Here, as explained earlier, we are focusing on the fact that cell temperatures are not raised when fuel is being decreased, therefore cell sensitivity of degradation is low, hence we have optimized to avoid excessive temperature drops as the result of fuel reductions, while restraining wasteful fuel consumption.

Note that FIGS. 10 and 11 relate to fuel supply amount, but changes occur similarly in the air supply amount and water supply amount relative to the required generation amount.

Next, at time t1 in FIG. 9, the degradation determining circuit 110a serving as degradation determining means built into the control section 110 starts operation of the degradation determining mode (FIG. 6). Note that the degradation determining circuit 110a comprises a microprocessor, a memory, a program for activating same, and the like (none of the above is shown). FIG. 12 is a flow chart showing the process carried out by the degradation determining circuit 110a.

The flow chart shown in FIG. 12 is executed at a regular predetermined time interval by the degradation determining circuit 110a. First, in step S1, a determination is made of time elapsed since the previous degradation determining mode operation. If the predetermined 2 week degradation determining interval has not elapsed since the previous degradation determining mode operation, the system advances to step S9, and one iteration of this flow chart is completed. This process makes it possible to prevent power supply stoppages and unnecessary consumption of fuel and the like caused by unnecessary frequent execution of the degradation determining mode operation. Note that in the present embodiment the process is performed every 2 weeks, but it is desirable to optimize this in response to the condition of the cell degradation; if cell degradation seems to be happening on the order of once every few months, a unit of several months is desirable; if the fuel cell usage period is short, there is almost no degradation, so together with increasing the usage period, the degradation determination is made longer at the beginning and shorter later on—this approach becomes far more desirable.

When 2 weeks or more have elapsed from the previous degradation determining mode operation, the system advances to step S2 and, in order to reduce degradation determination error, a judgment is made as to whether the outside environment of the solid oxide fuel cell 1, which affects cell temperature changes, is in a predetermined degradation determination outside atmospheric state appropriate to the degradation determining mode operation. Specifically, a determination is made as to whether the outside air temperature and outside air humidity detected by the outside air temperature sensor 150 (FIG. 6) and outside air humidity sensor (not shown) conform to predetermined condition. In the present embodiment, if the outside air temperature is 5-30° C. and the outside air humidity is 30-70%, the outside environment is judged to be in a degradation determining atmospheric state appropriate to the degradation determining mode operation. If it is judged that the external environment is not in the degradation determination outside atmospheric state, the system advances to step S9, and one iteration of this flow chart is completed.

When the outside environment is suited to the degradation determining mode operation, the system advances to step S3, and the degradation determining mode operation is started. In step S4, certain values are fixed at predetermined values corresponding to predetermined degradation determining generation amounts for which the fuel supply, air supply, and water supply amounts are set in advance. In other words, in the degradation determining mode operation, the degradation determining circuit 110a controls the fuel flow rate regulator unit 38, the generating air flow rate regulator unit 45, and the water flow rate regulator unit 28 to maintain a fixed supply amount irrespective of the required generation amount being requested of the control section 110. At time t1 in FIG. 9 of the present embodiment, the degradation determining fuel supply amount is fixed at 3 L/min, the degradation determining oxidant gas supply amount at 100 L/min, and the degradation determining water supply amount at 8 mL/min.

The fixed values corresponding to these degradation determination generation amounts are the supply amounts corresponding to the maximum amount of 700 W, which is the solid oxide fuel cell 1 rated generation amount. Therefore during the period when fuel, air, and water are being supplied at fixed values, the solid oxide fuel cell 1 is capable of outputting 700 W of power, but because the generating reaction changes if power is output during this determination period, so that cell temperatures are unstable and an accurate degradation determination cannot be performed, the output of power is stopped and the fuel cannot be used for the generating reaction, so the fuel is not used to generate electricity, and is completely combusted in the combustion chamber 18. Note that in this embodiment the output of power was prohibited, but changes are permissible if they stabilize the power in a fixed state, such as by outputting a fixed 700 W and selling power not required for supply to a utility company, or causing it to be consumed by auxiliary devices, etc. The point is that a load following state in which required power is being followed is not a desirable state for degradation determination, since the generating reaction changes, which causes cell temperatures to vary greatly.

Next, in step S5 of FIG. 12, after operation using fixed values has begun, a judgment is made as to whether sufficient time has elapsed and a stable operating state has been achieved. In the present invention, the operating state stabilizes (cell temperatures stabilize) when the degradation determining time of 5 hours has elapsed after starting operation according to fixed values, and a judgment is made that the predetermined degradation determining operating condition has been satisfied. If the fixed value-based time of 5 hours after start of operation has not elapsed, the step S5 process is repeated. Operation using fixed values started in step S4 is thus maintained over a period of 5 hours (FIG. 9, times t1–t2).

After fixed value-based operation has continued for 5 hours, the system advances to step S6 at time t2 in FIG. 9, and a judgment is made as to whether the temperature of the fuel cell module 2 measured by the generating chamber temperature sensor 142 serving as temperature detection means is equal to or greater than a predetermined temperature or not. In other words, degradation of the fuel cell module 2 is determined by comparing the temperature of the fuel cell module 2 resulting from operation of the fuel cell module 2 in a stable state with a reference temperature serving as a predetermined degradation determination reference value. In the solid oxide fuel cell 1 of the present embodiment, the reference temperature T0 of the fuel cell module 2 when operated at rated power of 700 W in the initial state is approximately 700° C.; as degradation of the fuel cell module 2 progresses, this temperature rises. This is caused by degradation of the fuel cell units 16 themselves, consisting of individual fuel cells, and by joule heating and the like due to increased internal resistance of the fuel cell stack 14 as the result of degradation in the junction portion which electrically connects the various fuel cell units 16.

In the present embodiment, the degradation determining circuit 110*a* determines that the fuel cell module 2 has degraded when the temperature T1 measured by the generating chamber temperature sensor 142 is 30° C. or more above the reference temperature T0. If the fuel cell module 2 has not degraded, the system advances to step S10, and one iteration of this flow chart process is completed; no change is made to operating condition such as fuel supply amount.

If it is determined that a fuel cell module 2 has degraded, the system advances to step S7, and degradation processing is started. In step S7 a fuel supply correction is executed by the fuel correction circuit 110*b* (FIG. 6), which is a fuel correction means built into the control section 110, and the fuel supply amount and fuel supply amount gain relative to the required generation amount are changed. In other words, when it is determined for the first time after the start of use of the solid oxide fuel cell 1 that the fuel cell module 2 has degraded, the fuel correction circuit 110*b* changes the fuel supply amount relative to the required generation amount using the fuel supply correction from the curve F0 to the curve F1 in FIG. 10, and thereafter determines the fuel supply amount using the curve F1. The rate of change when changing the fuel supply amount is changed from line F10 to more gradual line F11 in FIG. 11, and thereafter the fuel supply amount is changed using this rate of change. The fuel supply amount changed by the fuel supply correction is maintained until it is determined that the fuel cell module 2 has further degraded. Note that the fuel correction circuit 110*b* comprises a microprocessor, memory, a program for activating same, and the like (none of the above is shown).

When a fuel cell module 2 degrades, power output relative to the same fuel supply amount declines, so the fuel supply amount is determined by following a curve F1, in which the fuel supply amount is increased by 10% relative to the curve F0, thereby correcting the reduction in output power. A sudden change to the amount of fuel supplied to a degraded fuel cell module 2 can lead to further degradation, therefore the rate of change in the fuel supply amount is made smaller.

In the solid oxide fuel cell 1 of the present embodiment, when it is determined for the first time that the fuel cell module 2 has degraded, a correction is executed to increase the fuel supply amount, as described above, so that the rated output power is maintained. If degradation of the fuel cell module 2 advances and the fuel cell module 2 is determined to have degraded further, a correction is executed by the fuel correction circuit 110*b* according to the condition described below.

Note that when the fuel correction circuit 110*b* does another increasing correction to the fuel supply amount, the fuel supply amount is changed from the curve F1 to the curve F2, and if there is still another increasing correction, it is changed from curve F2 to curve F3. The fuel supply amount in curve F2 is increased 18% relative to curve F0, and 23% in curve F3 relative to curve F0. Hence there is an increase of 10% of initial fuel supply amount on the first determination of degradation, a further 8% of the initial fuel supply amount on the second determination (for a total of 18%), and a further 5% of the initial fuel supply amount on the third determination (for a total of 23%). Thus the amount of increase in the fuel supply amount in a single correction is defined to be at or under a maximum value, and the executed fuel supply correction is set so that the later the execution, the smaller is the amount of the increase. Excessive burden on a fuel cell module 2 in which degradation is progressing can in this way be prevented. The fuel supply amount gain is also changed from line F11 to line F12 on the second execution of an increasing correction, and from line F12 to line F13 on the third execution of an increasing correction.

Thus in the present embodiment the amount of increase to the fuel supply amount when executing an increasing correction is a pre-set fixed value. Therefore unlike cases in which, for example, the fuel supply amount correction amount is calculated based on the rise in temperature of a fuel cell module 2, or based on the amount of decline in output power, highly erroneous corrections can be prevented from occurring. That is, the temperature or output power of a fuel cell module 2 are affected by various factors which change their values, so calculating the amount of correction based on these values results in the execution of anomalous corrections when an anomalous temperature or output power is measured due to some factor.

After the fuel supply amount is corrected, the system advances to step S8; in step S8, the temperature T2 of a fuel cell module 2 when the solid oxide fuel cell 1 is operated using the post-correction fuel supply amount is measured by the generating chamber temperature sensor 142. The measured temperature T2 is stored in the degradation determining circuit 110*a* memory (not shown) as a new reference temperature T0. This new reference temperature T0 is used as the reference temperature for the next degradation determination. Preferably, after operation is conducted with the fuel supply amount at a fixed level for a predetermined time following correction of the fuel supply amount the temperature T2 of the fuel cell module 2 is measured. This enables an accurate temperature measurement which excludes the effects of changes to the fuel supply amount by corrections.

When the degradation processing described above is completed, the degradation determining circuit 110a ends the degradation determining mode operation, and the control section 110 resumes normal operation responsive to the required generation amount (FIG. 9, time t2).

Figure 13:
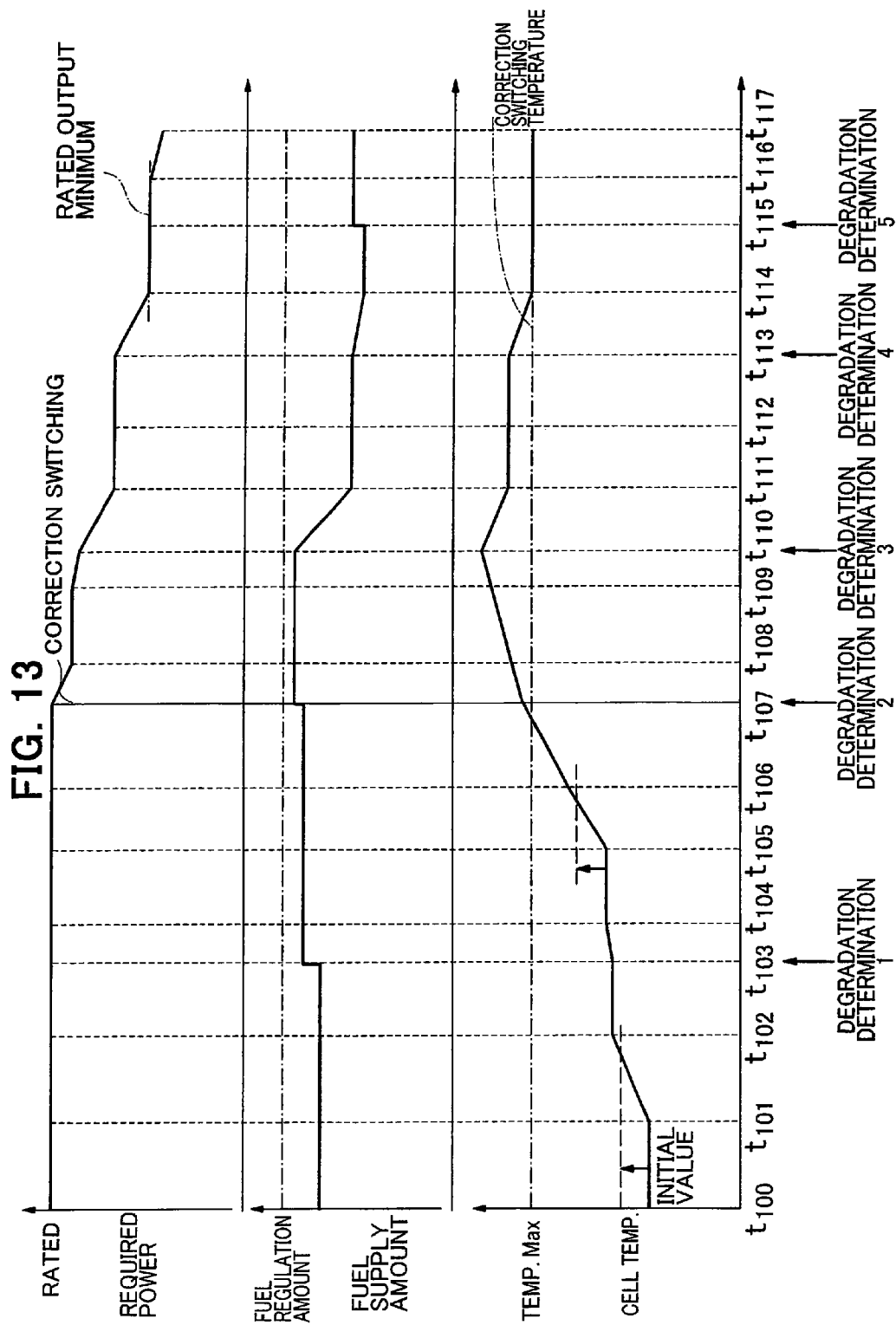
FIG. 13: A timing chart showing an example of fuel supply amount using the fuel correction circuit.
Figure 14:
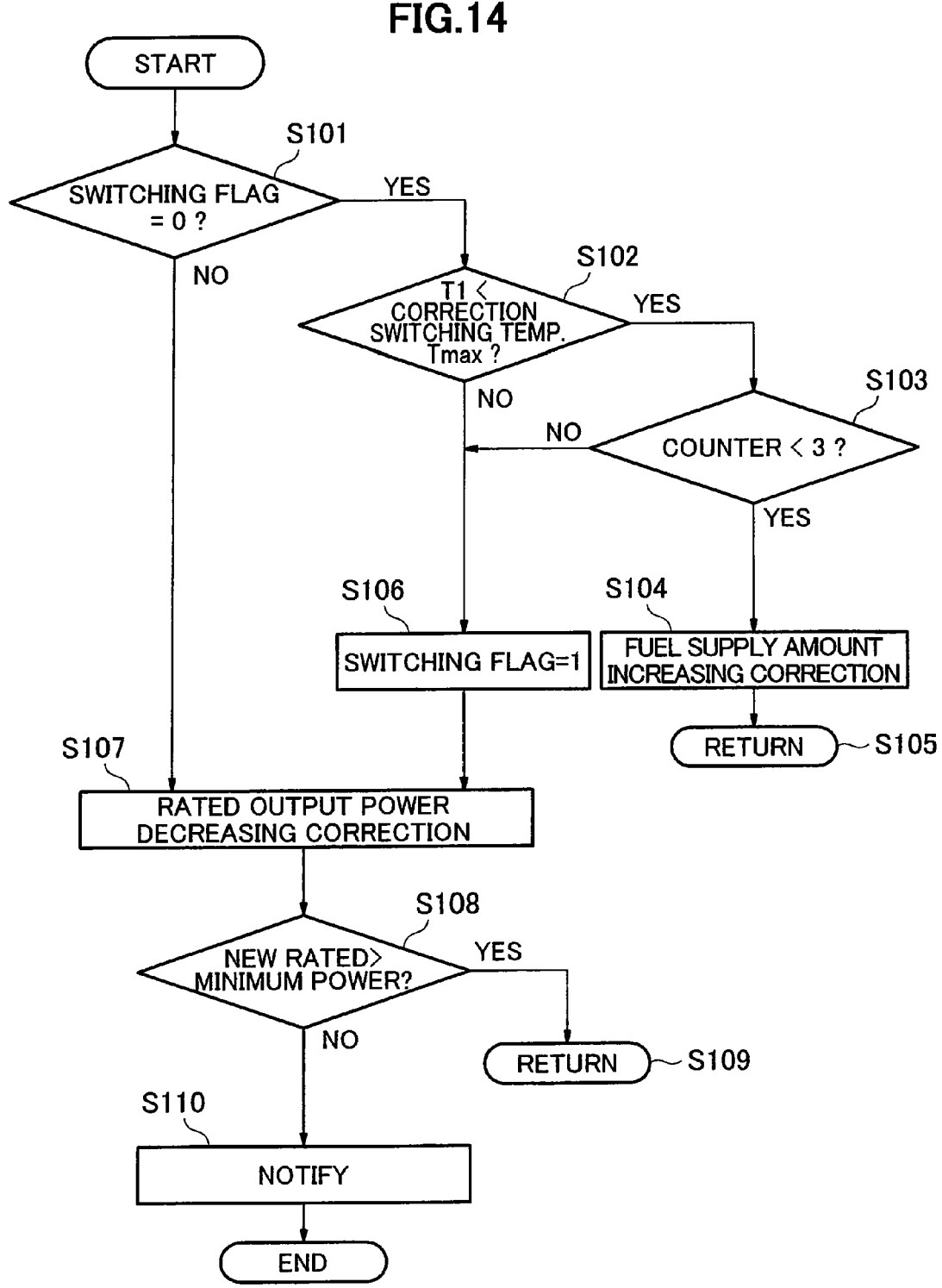
FIG. 14: A flow chart showing processing by the fuel correction circuit.

Next, referring to FIGS. 13 and 14, we discuss details of a fuel correction by the fuel correction circuit 110b. FIG. 13 is a timing chart showing an example of fuel supply amount using the fuel correction circuit 110b. FIG. 14 is flow chart showing processing by the fuel correction circuit 110b. Note that FIG. 13 is a timing chart showing time on the horizontal axis, and output power, fuel supply amount, and fuel cell unit temperature on the vertical axis; more than the timing chart in FIG. 9, this chart shows the fuel cell operating state schematically over an extremely long time period. Also, because the timing chart is simplified, the solid oxide fuel cell 1 is depicted as always being operated at rated output power. The flow chart in FIG. 14 is called as a subroutine by step S7 in the flow chart shown in FIG. 12.

First, at time t100 in FIG. 13, initial use of the solid oxide fuel cell 1 is begun. At this initial operating time, the rated output power, which is the maximum output power of the solid oxide fuel cell, is obtained by operating the solid oxide fuel cell 1 at a specified fuel supply amount; the temperature at this time is stored in the degradation determining circuit 110a as the initial reference temperature T0 for the fuel cell unit 16.

Degradation of the fuel cell module 2 begins as solid oxide fuel cell 1 usage time extends, reducing output voltage relative to the same amount of fuel supplied. When fuel cell module 2 output voltage drops, the output current extracted from the fuel cell module 2 must be increased to obtain the rated output power. Along with this increase in output current, the temperature of the fuel cell unit 16 also rises (times t101-t102 in FIG. 13).

Next, at time t103, a degradation determination is carried out and the flow chart shown in FIG. 12 is executed. At time t103, the temperature of the fuel cell unit 16 during rated output power operation has risen 30° C. or greater above the reference temperature T0 (the temperature at time t100), therefore processing transitions from step S6 to step S7 in FIG. 12, and the subroutine shown in FIG. 14 is called.

In step S101 of FIG. 14, the value of the switching flag FL1 is determined. In the solid oxide fuel cell 1 initial state, the switching flag FL1 is set to 0, therefore processing moves to step S102. In step S102, a determination is made of the temperature T1 of the fuel cell unit 16 at time t103. If the temperature T1 is lower than the correction switching temperature Tmax, which is a predetermined correction switching condition, the system advances to step S103; if higher than the correction switching temperature Tmax, it advances to step S106. Note that in the present embodiment, the correction switching temperature Tmax is set to 900° C.

In step S103, the value of the increasing correction iteration counter is determined. The increasing correction iteration counter is a counter for totaling the number of iterations of increasing corrections to the fuel supply amount after the initial start of use. If the number of increasing corrections is less than 3, the system advances to step S104; if 3 or greater, it advances to step S106.

In step S104, an increasing correction is applied to the fuel supply amount (time t103 in FIG. 13) so as to maintain the initial rated output power without excessively increasing the output current extracted from the fuel cell module 2, and the increasing correction iteration counter is incremented by 1. In other words, when a fuel cell module 2 degrades, the output voltage relative to the same fuel supply amount declines. The output current is increased to make up for this decline in output voltage, but if the output current is too large, the burden on the fuel cell unit 16 becomes large, leading to faster degradation of the fuel cell module 2. An increasing correction is therefore made to the fuel supply amount so that the output current does not rise above a pre-set predetermined value. Here, if this is the first increasing correction, the curve determining the fuel supply amount is changed from curve F0 to curve F1 in FIG. 10, and the increasing correction iteration counter value is changed from a 0 to a 1. The temperature after the increasing correction to the fuel supply amount (the temperature at t104 in FIG. 13) is updated and stored as a new reference temperature T0 (step S8 in FIG. 12). A rise in the output current of the fuel cell module 2 needed to obtain the initial rated output power is restrained by this increasing correction to the fuel supply amount, as is a rise in the temperature of the fuel cell unit 16 (times t104-t105 in FIG. 13).

When a further solid oxide fuel cell 1 usage period has elapsed, degradation of the fuel cell module 2 advances further, and the output voltage relative to fuel supply amount declines. The output current of the fuel cell module 2 rises in order to make up for this decline in output voltage, as does the temperature of the fuel cell unit 16 (times t106-t107 in FIG. 13). Next, at time t107, a degradation determination is performed. At time t107, the temperature of the fuel cell unit 16 during rated output power operation has risen 30° C. or greater above the reference temperature T0 (the temperature at time t104), therefore the flow chart shown in FIG. 14 is called from step S7 in FIG. 12. At time t107, the temperature of the fuel cell unit 16 during rated output power operation exceeds the correction switching temperature Tmax of 900° C. Steps S101, S102, and S106 in the FIG. 14 flow chart are therefore executed in sequence.

In step S106, the switching flag FL1 value is changed from a 0 to a 1. The switching flag FL1 is a flag indicating whether the fuel correction circuit 110b is correcting the fuel supply amount in order to maintain the initial rated output power. While the switching flag FL1 value is a 0, the fuel supply amount is corrected so that the rated output power can be maintained; when the switching flag FL1 value is changed to a 1, the fuel correction circuit 110b executes a correction to reduce the rated output power operating the solid oxide fuel cell. Thus when the correction switching temperature Tmax serving as maximum temperature is exceeded, the fuel correction circuit 110b reduces the rated output power without executing a correction so as to be able to maintain the rated output power.

Note that in the timing chart shown in FIG. 13, the temperature of the fuel cell unit 16 during rated output power operation exceeds the correction switching temperature, therefore the switching flag FL1 value is changed from 0 to 1, but the switching flag FL1 value is also changed from 0 to 1 in cases where an increasing correction has been applied to the fuel supply amount over the last three iterations (step S103 in FIG. 14), and a correction is executed to reduce the rated output power.

Next, in step S107, the rated output power is reduced and the fuel supply amount is corrected. In other words, the fuel correction circuit 110b corrects the fuel supply amount so that fuel cell unit 16 temperature does not rise excessively, and reduces the rated output power extracted from the fuel cell module 2. Specifically, at time t107 in FIG. 13, the fuel correction circuit 110b slightly increases the fuel supply amount, and reduces the rated output power extracted from the fuel cell module 2 (times t1074108 in FIG. 13).

In addition, in step S108, a determination is made of the value of the newly set rated output power. If the new rated output power is larger than a predetermined minimum power Tmin, the system advances to step S109, and one iteration of the processing in the FIG. 14 flow chart ends. Thereafter, the solid oxide fuel cell 1 is operated using a reduced rated output power (times t108-t110 in FIG. 13). If the new rated output power is less than or equal to the predetermined minimum power Tmin, the system advances to step S110.

Note that in the example shown in FIG. 13, the temperature of the fuel cell unit 16 exceeds the correction switching temperature at time t107, but if the correction switching temperature is not exceeded, steps S101, S102, S103, and S104 in FIG. 14 are executed in sequence. Furthermore, if this is the second increasing correction, the curve determining the fuel supply amount is changed from curve F1 to curve F2 in FIG. 10, the increasing correction iteration counter value is changed from a 1 to a 2, and the fuel supply amount is further corrected to increase.

When a further solid oxide fuel cell 1 usage period has elapsed, degradation of the fuel cell module 2 advances further, and the output voltage relative to fuel supply amount declines, while the temperature of the fuel cell unit 16 also rises (times t109-t110 in FIG. 13).

Next, at time t110, a degradation determination is performed. At time t110, because the value of the switching flag FL1 has been changed to a 1, steps S101 and S107 in the FIG. 14 flow chart are executed in sequence. At time t110, the fuel correction circuit 110b performs a correction to decrease the fuel supply amount, and further reduces the rated output power extracted from the fuel cell module 2 (times t110-t111 in FIG. 13).

Next, at time t113, a degradation determination is performed; if it is determined that further degradation of the fuel cell module 2 has occurred, steps S101 and S107 in the FIG. 14 flow chart are executed in sequence. In step S107, the fuel correction circuit 110b performs a correction to decrease the fuel supply amount, and further reduces the rated output power extracted from the fuel cell module 2 (times t113-t114 in FIG. 13). The range of the decrease to the fuel supply amount at times t113-t114 is made smaller than the range of decrease in the fuel supply amount decreasing correction (times t110-t111). The decrease in rated output power at times t113-t114 causes the rated output power to drop to a pre-set predetermined minimum power.

Next, at time t115, a degradation determination is performed; if it is determined that further degradation of the fuel cell module 2 has occurred, steps S101 and S107 in the FIG. 14 flow chart are executed in sequence. At step S107, because the rated output power has already been lowered to the minimum power, the fuel correction circuit 110b executes a correction to maintain the minimum power, and does not execute a correction to reduce the rated output power. That is, the fuel correction circuit 110b executes an increasing correction of the fuel supply amount so that the minimum power can be maintained even if the fuel cell module 2 is in a degraded state.

Next, at time t116, the output power declines to below a minimum power due to the degradation of the fuel cell module 2. When the minimum power can no longer be maintained even though the fuel correction circuit 110b executes a correction, the control section 110 sends a signal to the warning device 116 to inform users that the solid oxide fuel cell 1 has reached its product life, and stops operation of the fuel cell module 2.

In the solid oxide fuel cell 1 embodiment of the present invention, the fuel supply amount is corrected so that the rated output power is maintained when a degradation determination is made prior to the fulfillment of predetermined correction switching condition (time t103 in FIG. 13). When degradation further progresses to the degree that the predetermined correction switching condition are satisfied, maintaining of the fuel cell module rated output power is interrupted, rated output power is reduced (times t107-t108, t110-t111, and t113-t114 in FIG. 13), and the fuel cell module is operated in a manner that places weight on extending fuel cell module life. Excessively high temperature states in the fuel cell units 16 can thus be restrained, and the time period over which initial rated output power is maintained can be extended while inhibiting curtailment of the period over which the fuel cell module 2 can be used. Also, because rated output power is reduced after degradation progresses and generating efficiency drops, it becomes possible to maintain the supply of electrical power in a range capable of withstanding practical use while restraining increases in running costs, and the fuel cell module 2 can continue to be used over long time periods.

Also, using the solid oxide fuel cell 1 of the present embodiment, when the temperature of the fuel cell unit 16 rises to a correction switching temperature or above (time t107 in FIG. 13), a correction is executed to reduce the rated output power, so that promotion of fuel cell unit 16 degradation can be prevented.

Moreover, in the solid oxide fuel cell of the present embodiment, the fuel correction circuit 110b executes a correction to reduce the fuel supply amount supplied to the fuel cell module 2 after predetermined correction switching condition is fulfilled (time t110-t111 and t113-t114 in FIG. 13), and the range of fuel supply amount reduction in this correction is smaller in the correction executed later (t113-t114) than in the correction executed earlier (t110-t111). The fuel cell module 2 was subjected to a burden in order to maintain the rated output power until the correction switching condition was met in the fuel cell module, therefore after the correction switching condition is satisfied the fuel supply amount is greatly reduced (t110-t111), and the burden on the fuel cell module is reduced. On the other hand, there is no major reduction in the fuel supply amount after the burden on the fuel cell module is reduced (t113-t114), and major declines in output power are prevented. This makes it possible both to extend the number of years of usable fuel cell module life, and to maintain output power.

Also, in the solid oxide fuel cell 1 of the present embodiment, the fuel cell is operated so that the temperature of the fuel cell unit 16 does not rise after the predetermined correction switching condition is satisfied (times t110-t111 and t113-t114 in FIG. 13). There is a tendency for solid oxide fuel cell 16 temperatures to rise with the advance of degradation, and breakage of the solid oxide fuel cells 16 may be induced by excessive temperature rises. In the present embodiment excessive temperature rises are prevented, and increased burden on solid oxide fuel cells 16 in which degradation has advanced can be avoided. This makes it possible to extend the number of years of usable fuel cell module life.

In addition, using the solid oxide fuel cell 1 of the present embodiment, the fuel correction circuit 110b corrects the fuel supply amount supplied to the fuel cell module so as to decrease the temperature of the solid oxide fuel cells after the predetermined correction switching condition is satisfied (times t110-t111 and t113-t114 in FIG. 13). The fuel cell is thus operated so that the temperature of the solid oxide fuel cells 16 declines after the predetermined correction switching condition is satisfied, therefore the burden on the solid oxide fuel cells 16 is actively reduced, and fuel cell module usable life can be greatly extended.

Also, in the solid oxide fuel cell 1 of the present embodiment, the fuel correction circuit 110b executes a correction to reduce the rated output power of the fuel cell module after predetermined correction switching condition is satisfied (times t110-t111 and t113-t114 in FIG. 13), while on the other hand once the rated output power declines to a predetermined minimum power, it executes corrections to maintain the rated output power thereafter (time t115 in FIG. 13). As a result, rated output power is reduced as degradation advances so as to reduce the burden on and extend the useful life of the fuel cell module 2, while at the same time loss of utility of the fuel cells is prevented by maintaining rated output power at a minimum power or above.

Furthermore, in the solid oxide fuel cell 1 of the present embodiment a notification device gives notice that the fuel cell module can no longer produce a minimum electrical power when the predetermined minimum power can no longer be maintained, notwithstanding the execution of corrections by the fuel correction circuit 110b (t117 in FIG. 13).

The fact that the fuel cell module 2 can no longer produce minimum power is thus notified, thereby prompting maintenance and parts changes in the fuel cell module 2.

When, in the above-described embodiment, the fuel cell unit temperature rises to the correction switching temperature or above, or the number of increasing corrections exceeds 3, a switch is made from correcting to increase the fuel supply amount to correcting to decrease the rated output power, but it would also be acceptable as a variation to constitute the present invention to switch to a correction to reduce rated output power when the fuel supply amount increases to a predetermined correction switching fuel supply amount.

FIG. 15 is a timing chart showing an example of the action of a fuel cell unit according to this variation.

In the FIG. 15 timing chart, a determination is made that the fuel cell module has degraded at times t201, t202, and t203. A correction increasing the fuel supply amount by a predetermined amount at each time is thus performed. The fuel supply amount is increased up to a correction switching fuel supply amount by the increasing correction executed at time t203, therefore at time t204 when the next degradation is determined, the fuel correction circuit executes a correction to reduce the rated output power.

In the present invention when the fuel supply amount reaches the correction switching fuel supply amount, a correction is executed to reduce the rated output power, therefore fuel wastage due to excess fuel supply can be prevented.

Furthermore, in the above-described embodiment the degradation determining circuit determines degradation of the fuel cell module using the temperature of the fuel cell unit, but it would also be acceptable as a variation for the degradation determining circuit to determine degradation of the fuel cell module based on the fuel cell module output power or output voltage when operated under predetermined degradation determining operating conditions.

Also, in the above-described embodiment, the degradation determining circuit performs a correction to reduce rated output power when the fuel cell unit temperature rises to a predetermined correction switching temperature or above, but it would also be acceptable as a variation of the fuel correction circuit to execute a correction to reduce rated output power when the output power of the fuel cell unit under predetermined degradation determining operating condition declines to a predetermined correction switching power or below, or when the output voltage of the fuel cell unit under predetermined degradation determining operating condition fall to a predetermined correction switching voltage or below.

In this variation, when the fuel cell module output power declines to a correction switching power or below, or when the output voltage declines to a predetermined correction switching voltage or below, a correction is executed to reduce the rated output power, therefore promotion of degradation of fuel cells caused by an excessive fuel cell temperature rise can be prevented. Also, by switching correction type based on fuel cell module temperature and output power, correction switching timing can be more accurately specified.

We have explained preferred embodiments of the present invention above, but various changes may be added to the above-described embodiments. In particular, in the above-described embodiment the solid oxide fuel cell was constituted to change output power in response to required generation amount, but the present invention can be applied to a solid oxide fuel cell in which a fixed rated output power is output constantly.

Also, after reaching the predetermined correction switching condition, corrections may be executed to reduce rated output power by controlling the fuel supply amount so that the temperature of the fuel cell unit is constantly maintained at a predetermined maximum temperature, without performing a degradation determination using a degradation determining circuit. By so doing, the output power at the maximum temperature would be considered the rated output power after reaching predetermined correction switching condition, therefore operation exceeding the maximum temperature could be avoided, and promotion of fuel cell degradation prevented.

EXPLANATION OF REFERENCE NUMERALS

1: Solid oxide fuel cell
2: Fuel cell module
4: Auxiliary unit
8: Sealed space
10: Electrical generating chamber
12: Fuel cell assembly
14: Fuel cell stack
16: fuel cell units (solid oxide fuel cells)
18: Combustion chamber
20: Reformer
22: Heat exchanger for air
24: Water supply source
26: Pure water tank
28: Water flow rate regulator unit (water supply device; water supply means)
30: Fuel supply source
38: Fuel flow rate regulator unit (fuel supply device; fuel supply means)
40: Air supply source
44: Reforming air flow rate regulator unit
45: Generating air flow rate regulator unit (oxidant gas supply device; oxidant gas supply means).
46: First heater
48: Second heater
50: Hot water production device 52: Control box
54: Inverter
83: Ignition device
84: Fuel cells
110: Control section (controller, control means)
110a: Degradation Determining Circuit (degradation determining means)
110b: Fuel correction circuit (fuel correction means)
112: Operating device
114: Display device
116: Notification device
126: Electrical power state detecting sensor
142: Generating chamber temperature sensor (temperature detection means)
150: Outside air temperature sensor

The invention claimed is:

1. A solid oxide fuel cell system comprising:
a fuel cell module comprising multiple fuel cell units;
a fuel supply device configured to supply fuel to the fuel cell module according to a fuel supply function which defines a relationship between a demand for output power from the solid oxide fuel cell and an amount of fuel supply to the fuel cell module for meeting the demand;
an oxidation gas supply device configured to supply oxidant gas to the fuel cell module; and
a controller programmed to control an amount of a fuel supply to the fuel cell module;
wherein the controller comprises a degradation determining circuit programmed to determine degradation of the fuel cell module, and a fuel correction circuit programmed to correct the fuel supply function to adjust the amount of the fuel supply based on a result of determination performed by the degradation determining circuit,
the fuel correction circuit is programmed to correct the fuel supply function, if the degradation determining circuit determines, before a predetermined correction switching condition is satisfied, that the fuel cell module has degraded, so as to increase the fuel supply to the fuel cell module so that a maximum rated power output from the fuel cell module is maintained, whereas the fuel correction circuit is further programmed to correct the fuel supply function, after degradation of the fuel cell module has progressed and the predetermined correction switching condition is satisfied, so as to reduce the fuel supply to the fuel cell module so that the maximum rated output power is reduced, and
the predetermined correction switching condition comprises one of (a) a rise of an operation temperature of the fuel cell unit temperature to a predetermined threshold temperature or above, (b) an increase of the fuel supply to a predetermined threshold amount, (c) a decrease of an output power of the fuel cell module to a predetermined threshold power or below, and (d) a decrease of an output voltage of the fuel cell module to a predetermined threshold voltage or below.

2. The solid oxide fuel cell system of claim 1, wherein the fuel correction circuit is programmed to correct the fuel supply function, after the predetermined correction switching condition is satisfied, so as to reduce the fuel supply to the fuel cell module, and a range of reduction of the fuel supply becomes gradually smaller as a reduction of the fuel supply is implemented consecutively.

3. The solid oxide fuel cell system of claim 1, wherein the fuel correction circuit is programmed to correct the fuel supply function to reduce the fuel supply to the fuel cell module so that an operation temperature of the fuel cell unit does not rise after the predetermined correction switching condition is satisfied.

4. The solid oxide fuel cell system of claim 3, wherein the fuel correction circuit is programmed to correct the fuel supply function to reduce the fuel supply to the fuel cell module so that the operation temperature of the fuel cell unit temperature declines after the predetermined correction switching condition is satisfied.

5. The solid oxide fuel cell system of claim 1, wherein the fuel correction circuit is programmed to correct the fuel cell function, after the predetermined correction switching condition is satisfied, so as to reduce the maximum rated output power from the fuel cell module and, once the maximum rated output power drops below a predetermined minimum power, correct the fuel supply function to maintain the predetermined minimum output power.

6. The solid oxide fuel cell system of claim 5, further comprising a notification device, wherein the notification device notifies, when the fuel correction circuit is unable to maintain the predetermined minimum power even after correcting the fuel supply function, that the fuel cell module can no longer produce the predetermined minimum power.

7. A solid oxide fuel cell system comprising:
a fuel cell module comprising multiple fuel cell units, the fuel cell module being supplied with fuel according to a fuel supply function to output electric power, wherein the fuel supply function defines a relationship between a demand for output power from the solid oxide fuel cell and an amount of fuel supply to the fuel cell module for meeting the demand;
a detecting device which detects degradation of the fuel cell module exhibited by an increase in an internal resistance of the fuel cell module; and
a fuel correction device programmed to be responsive to detection of degradation by the detecting device to determine whether the fuel cell module has degraded below a predetermined degradation level, wherein the fuel correction device is programmed to correct fuel supply function, when it is determined that the fuel cell module has not degraded below the predetermined degradation level, so as to increase the fuel supply to the fuel cell module so that a maximum rated output power from the fuel cell module is prevented from falling, whereas, when it is determined that the fuel cell module has degraded below the predetermined degradation level, correct the fuel supply function to decrease the fuel supply to allow the maximum rated output power to fall.

8. The solid oxide fuel cell system according to claim 7, wherein the detecting device detects degradation of the fuel cell module if an operation temperature at which the fuel cell mode operates at a predetermined output power level is higher than an expected temperature.

9. The solid oxide fuel cell system according to claim 8, wherein the predetermined output power level is the maximum rated output power of the solid oxide fuel cell module.

10. The solid oxide fuel cell system according to claim 8, wherein the expected temperature is a function of the operation temperature measured when the solid oxide fuel cell first operates and thereafter updated when the fuel supply is changed by the fuel correction device.

11. The solid oxide fuel cell system according to claim 7, wherein when determining whether the fuel cell module has degraded below the predetermined degradation level, the fuel correction device is programmed to determine at least one of:

(a) whether an operation temperature at which the fuel cell module operates at a predetermined output power level is higher than a threshold temperature;
(b) whether a fuel supply with which the fuel cell module operates at a predetermined output level is higher than a threshold amount;
(c) whether an output power from the fuel cell module which operates at a predetermined output power level is lower than a threshold power or below; and
(d) whether an output voltage of the fuel cell module which operates at a predetermined output power level is lower than a threshold voltage.

12. The solid oxide fuel cell system according to claim 7, wherein the fuel supply function comprises a plurality of predetermined fuel supply function curves, and the fuel correction device is programmed to move, responsive to detection of degradation by the detecting device, from one fuel supply function curve to an adjacent function curve in order to increase or decrease the fuel supply to the fuel cell module.

13. The solid oxide fuel cell system according to claim 12, the fuel supply function curves are arranged at progressively narrowing intervals so that an amount of change in the fuel supply becomes progressively smaller as the fuel correction device moves one supply function curve to an adjacent curve.

14. The solid oxide fuel cell system according to claim 7, wherein
the fuel correction device is further programmed to determine whether the maximum rated output power has decreased below a minimum required output power, and
the fuel correction device is programmed to correct the fuel supply function, even when it is determined that the fuel cell module has degraded below the predetermined degradation level, to increase the fuel supply to the fuel cell module to prevent the maximum rated output power from falling below the minimum required output power.

15. The solid oxide fuel cell system according to claim 7, wherein the fuel correction device is programmed to avoid increasing or decreasing the fuel supply at consecutive times more than a predetermined number.

* * * * *